US006793713B2

(12) United States Patent
Kretsinger et al.

(10) Patent No.: US 6,793,713 B2
(45) Date of Patent: Sep. 21, 2004

(54) METHOD FOR CONTROLLING MOISTURE LEVELS IN CAVITIES WITHIN BUILDINGS

(76) Inventors: Shane A. Kretsinger, 3826 Noble Ave. North, Robbinsdale, MN (US) 55422; Jack Lee Meyer, 2463 Ridge La., Mounds View, MN (US) 55112

( * ) Notice: Subject to any disclaimer, the term of this patent is extended or adjusted under 35 U.S.C. 154(b) by 0 days.

(21) Appl. No.: 10/194,756

(22) Filed: Jul. 12, 2002

(65) Prior Publication Data

US 2003/0205129 A1 Nov. 6, 2003

Related U.S. Application Data

(60) Provisional application No. 60/377,687, filed on May 3, 2002.

(51) Int. Cl.[7] .............................................. B01D 53/02
(52) U.S. Cl. .......................................... 95/117; 95/148
(58) Field of Search ................... 95/117, 148; 252/194; 206/0.7, 204; 34/81, 416; 52/404.1, 741.3, 742.1

(56) References Cited

U.S. PATENT DOCUMENTS

| 1,481,971 A | 1/1924 | Whiting |
| 2,554,879 A | 5/1951 | Race, Jr. |
| 2,887,426 A | * 5/1959 | Knold ........................ 428/490 |
| 4,319,679 A | 3/1982 | Gustafsson |
| 4,394,806 A | 7/1983 | Day |
| 4,698,891 A | 10/1987 | Borys |
| 5,556,682 A | 9/1996 | Gavin et al. |
| 5,987,833 A | * 11/1999 | Heffelfinger et al. ...... 52/406.2 |

OTHER PUBLICATIONS

*Product Update: Keeping Dry with Desiccants: New desiccant technologies suit even the most complex of packages. Pharmaceutical and Medical Packaging News Magazine, PMPN Article Index*,http://www.devicelink.com/pmpn/archive/98/02/009.html. Originally published Feb. 1998.

* cited by examiner

Primary Examiner—Frank M. Lawrence
(74) Attorney, Agent, or Firm—Dorsey & Whitney LLP

(57) ABSTRACT

A system and a method for controlling or reducing moisture levels in building cavities. Desiccant is used in combination with various containers for placing the desiccant into building cavities to control levels of moisture and mold in the cavities.

39 Claims, 21 Drawing Sheets

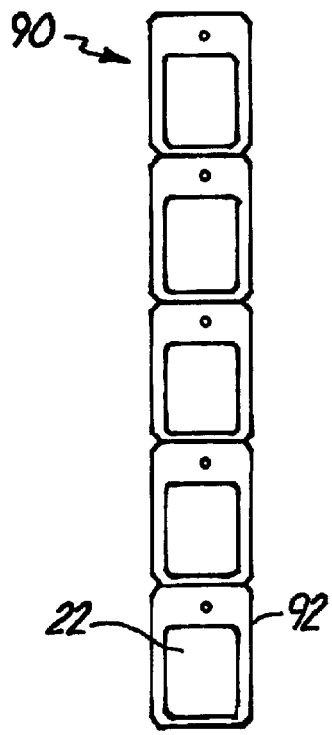
Fig. 14
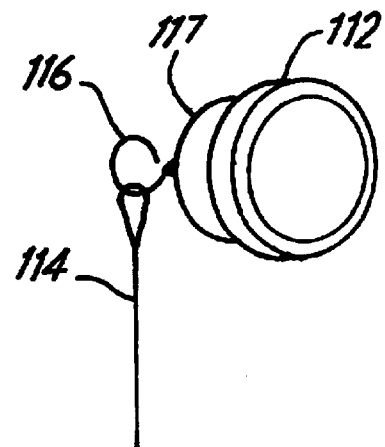
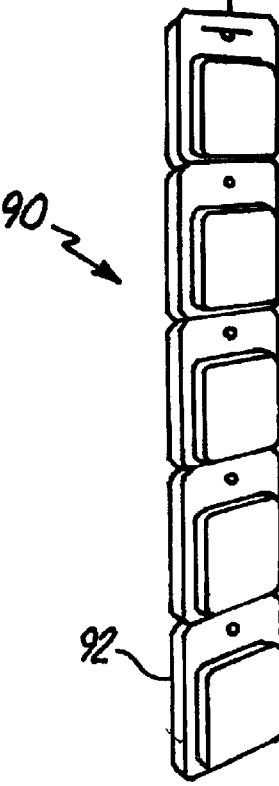
Fig. 15

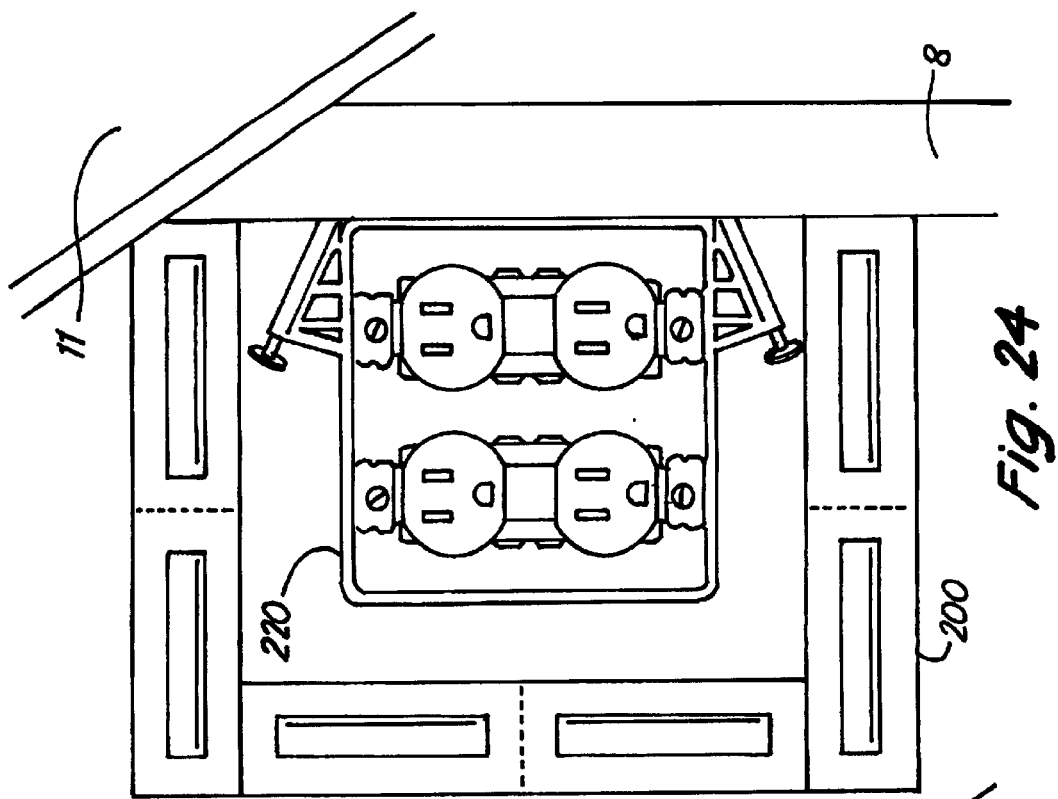
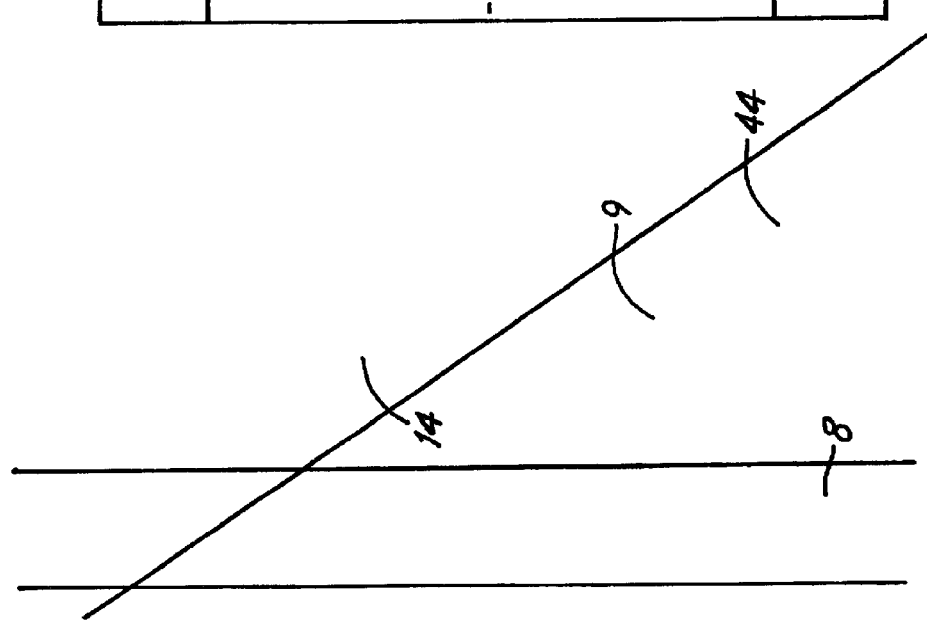
Fig. 24

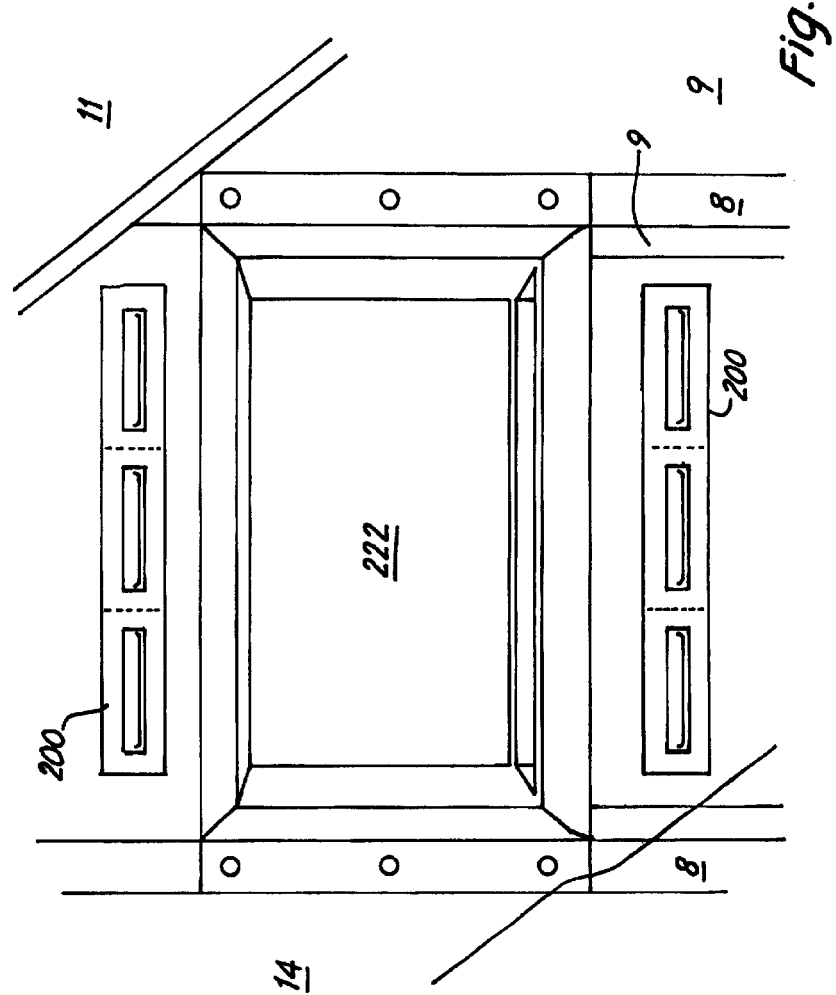

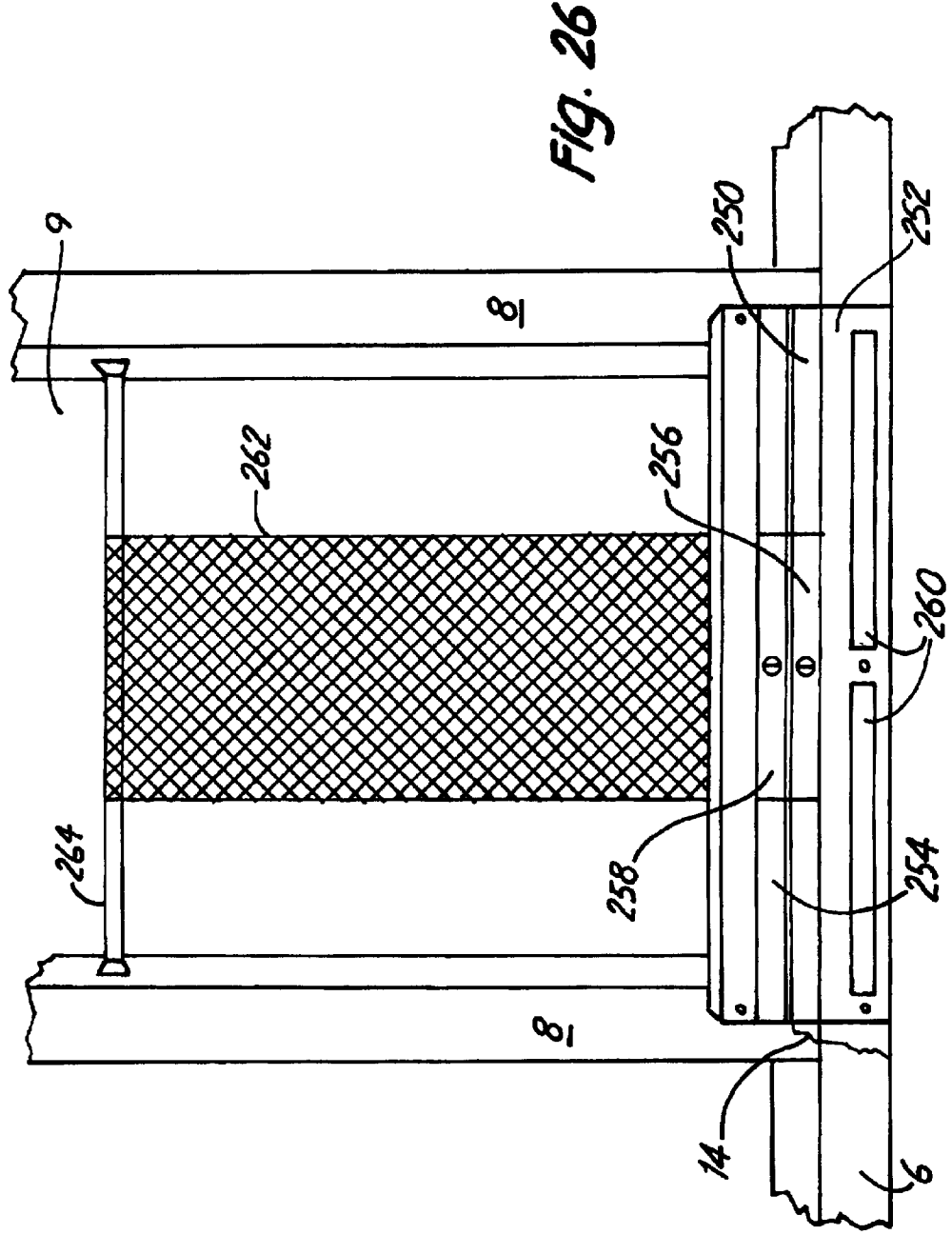

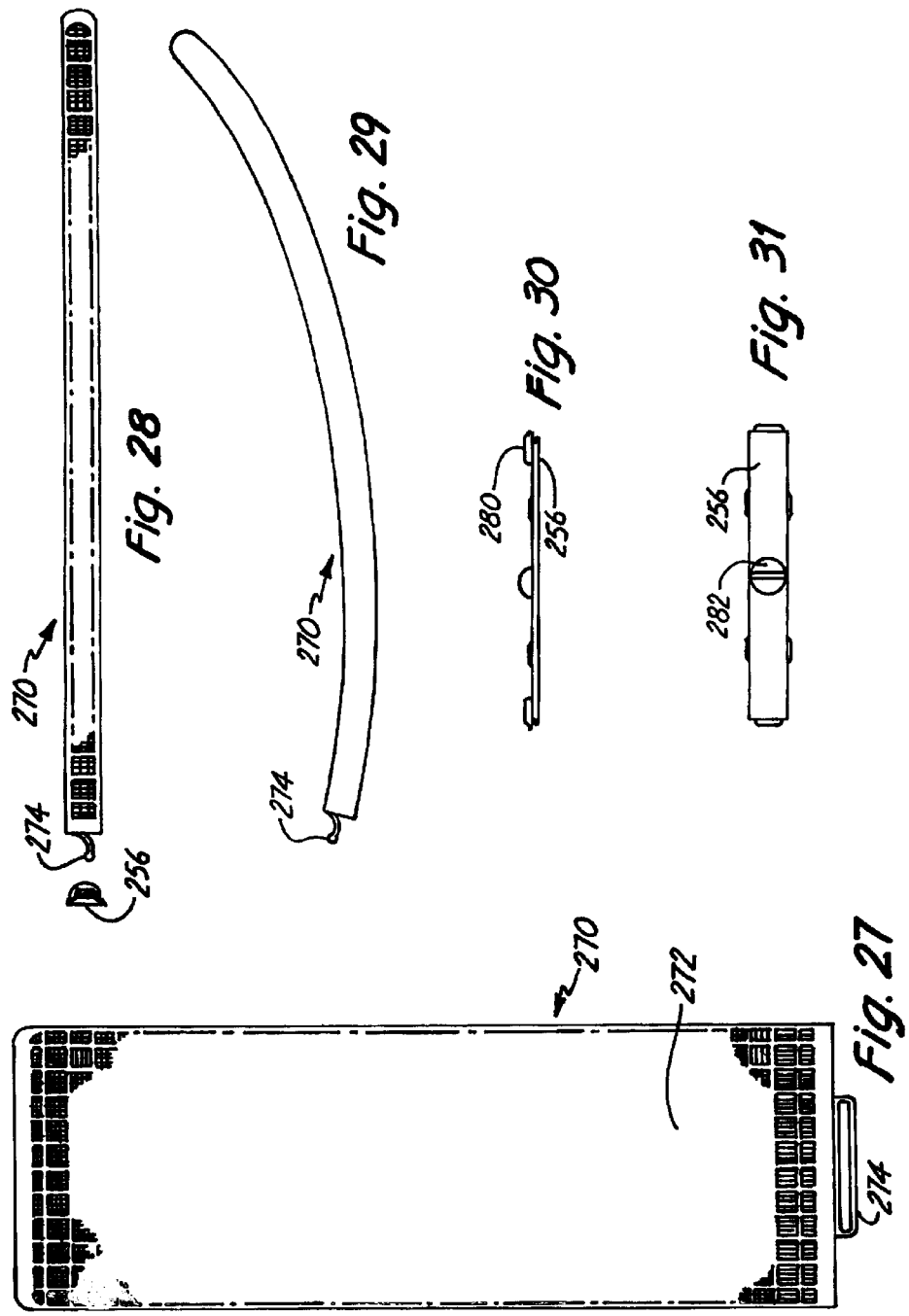

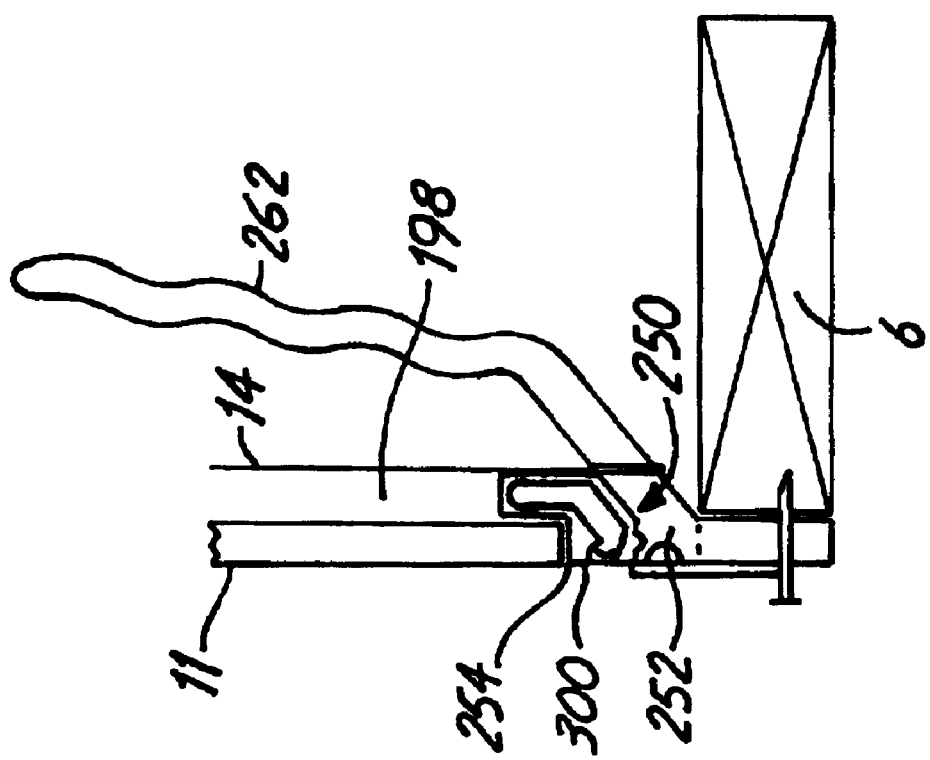

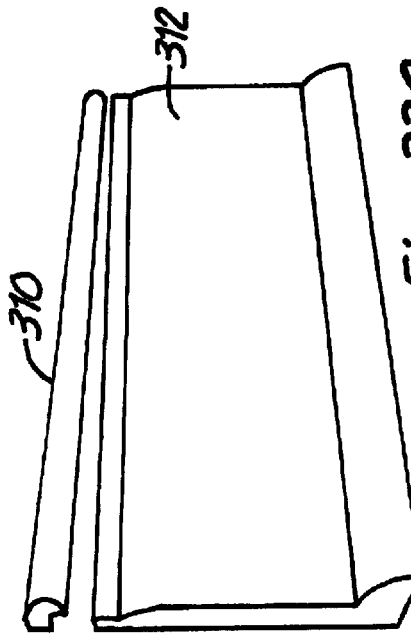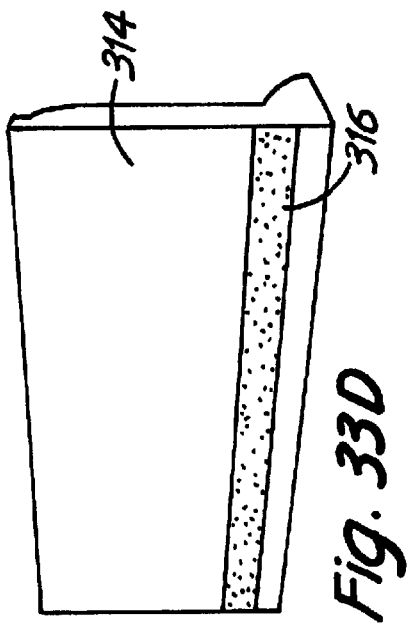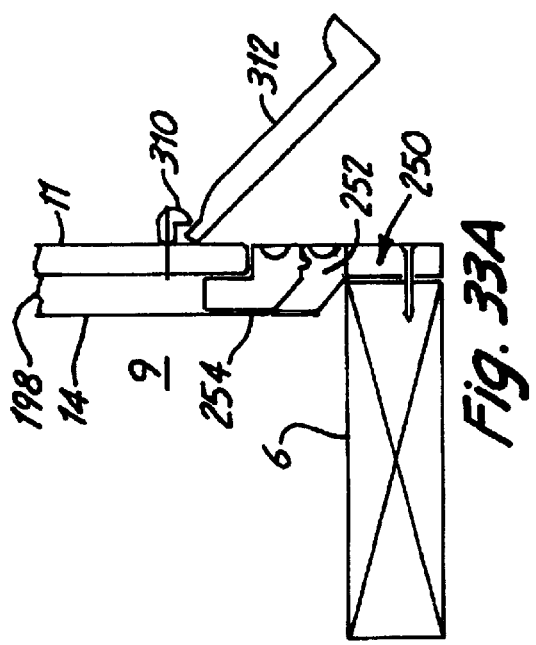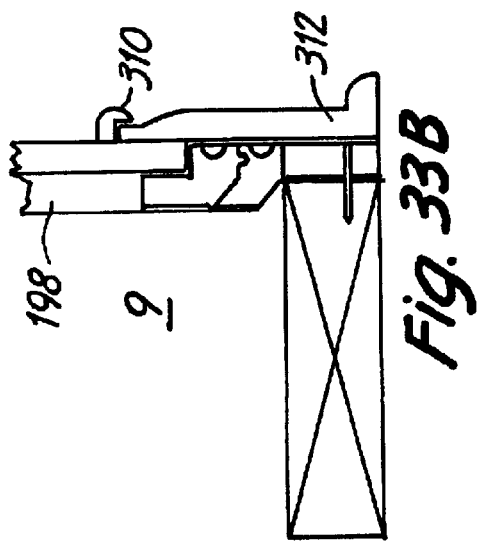

METHOD FOR CONTROLLING MOISTURE LEVELS IN CAVITIES WITHIN BUILDINGS

CROSS-REFERENCE TO RELATED APPLICATION

This application claims priority from U.S. Provisional Application No. 60/377,687, entitled "System and Method for Absorbing Moisture," by Shane Kretsinger, dated May 3, 2002, the contents of which are hereby incorporated in their entirety.

FIELD OF THE INVENTION

The present invention relates to controlling humidity. More specifically, the present invention relates to reducing or controlling moisture levels in cavities within buildings.

BACKGROUND OF THE INVENTION

Moisture can accumulate in building spaces such as spaces within a wall, floor, ceiling, and fenestration cavities (the areas between installed windows or doors and the nearest framing members). There are several possible causes for this accumulation. Improper building design may result in moisture entering building cavities. Structural failures may allow the introduction of moisture into an otherwise sound wall assembly or other structure. Such failures may include failure of roofing materials or improper application of flashing material. Moisture buildup in fenestration cavities can also be caused by condensation.

Moisture accumulation promotes the growth of molds and other moisture-loving organisms. Recently, the moisture buildup and resulting mold growth in newer building cavities has become a very serious problem. In fact, new homes with the moist, mold-stimulating cavities are now so prevalent that the phenomenon has a name: Sick Home or Sick Building Syndrome. There are over 60,000 types of known mold, and prolonged exposure to some alarmingly common types of mold can cause allergic reactions, very serious illnesses, horrific symptoms such as bleeding lungs or severe fevers, and in some cases, death. Some houses are a total loss as a result of the moisture and mold problems. The increase in mold-filled building cavities in new home and building construction is a source of great concern and significant speculation.

To alleviate the problem, the mold must be eliminated from the target building cavities or prevented from ever growing. One solution is to eliminate the moisture. Without water, mold cannot survive and will not generate. Currently, some mechanical devices are used that circulate air through the cavities to maintain moisture levels that do not promote mold growth. These devices, however, have significant drawbacks. For instance, such devices are expensive and bulky, requiring costly installation, continuing power costs, and valuable space. Further, installation of the mechanical devices requires the destruction of portions of the pre-existing finish materials. In addition, these complex devices will be susceptible to failures, creating further maintenance and repair costs and the danger that the moisture and mold may invade a space without the owner's knowledge.

There is a need in the art for controlling moisture and mold levels within cavities in buildings.

BRIEF SUMMARY OF THE INVENTION

The present invention, in one embodiment, is a moisture reduction apparatus having a permeable container including a desiccant that is capable of being introduced into a building cavity. In another embodiment, the present invention is a composition of building insulation and desiccant. In a further embodiment, the present invention is a desiccant implant with a permeable body capable of introduction into a wall cavity and having a cavity in the implant. In yet another embodiment, the present invention is a moisture control apparatus having a permeable container, a receiver providing access to a wall assembly cavity for the permeable container, and a permeable receptacle that receives the permeable container.

The present invention, in another embodiment, includes a wall assembly with a wall assembly cavity, a permeable container configured to be introduced into the cavity, and desiccant within the container. Another similar embodiment includes a wall assembly with a wall assembly cavity, a receiver providing access to the cavity, a permeable container configured to be inserted through the receiver and into the cavity, and a permeable receptacle configured to enclose the permeable container.

Another embodiment of the present invention is a method of reducing moisture that involves placing a permeable container containing desiccant into a building cavity. The present invention, in another embodiment, is a method of reducing moisture including drilling a hole in a finish material, inserting a permeable container including a desiccant, and filling the hole with a plug that is attached to the container. A further embodiment is a method that includes drilling a hole in a finish material and inserting a permeable implant including a desiccant into the hole. An additional embodiment is a method of reducing moisture involving providing a mixture of desiccant and building insulation and inserting the mixture into a building cavity.

The present invention, in another embodiment, is a method of controlling moisture that includes providing a permeable container containing desiccant, inserting the container into a wall assembly cavity through a receiver, and enclosing the container in a permeable receptacle within the wall assembly cavity.

In another embodiment, the present invention is a moisture control apparatus for controlling moisture within a building that includes a means for containing a desiccant and a means for delivering the desiccant to a building cavity.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 14 is a front planar view of five single-stage desiccant satchels on a desiccant jamb strip, according to one embodiment of the present invention.

FIG. 15 is a perspective view of five single-stage desiccant satchels on a desiccant jamb strip coupled to a jamb plug, according to one embodiment of the present invention.

FIG. 24 is a front, partially sectional planar view of a wall cavity containing an electrical box and having a plurality of the barrier strips affixed to a vapor barrier, according to one embodiment of the present invention.

FIG. 25 is a front partially sectional planar view of a wall cavity with a return vent and a plurality of the barrier strips affixed to the vapor barrier, according to one embodiment of the present invention.

FIG. 26 is front planar view of a wall cavity having a desiccant receiver, according to one embodiment of the present invention.

FIG. 27 is a top planar view of a desiccant cartridge that is receivable within the desiccant receiver of FIG. 26, according to one embodiment of the present invention.

FIG. 28 is a side elevational view of the desiccant cartridge, according to one embodiment of the present invention.

FIG. 29 is a side elevational schematic illustration of the desiccant cartridge in a flexed state, according to one embodiment of the present invention.

FIG. 30 is a top planar view of a removable faceplate, according to one embodiment of the present invention.

FIG. 31 is a front planar view of the removable faceplate, according to one embodiment of the present invention.

FIG. 32 is a side sectional view of a desiccant receiver, according to one embodiment of the present invention.

FIGS. 33A–33D illustrate a base and a cap strip, according to one embodiment of the present invention.

DETAILED DESCRIPTION

Figure 1:
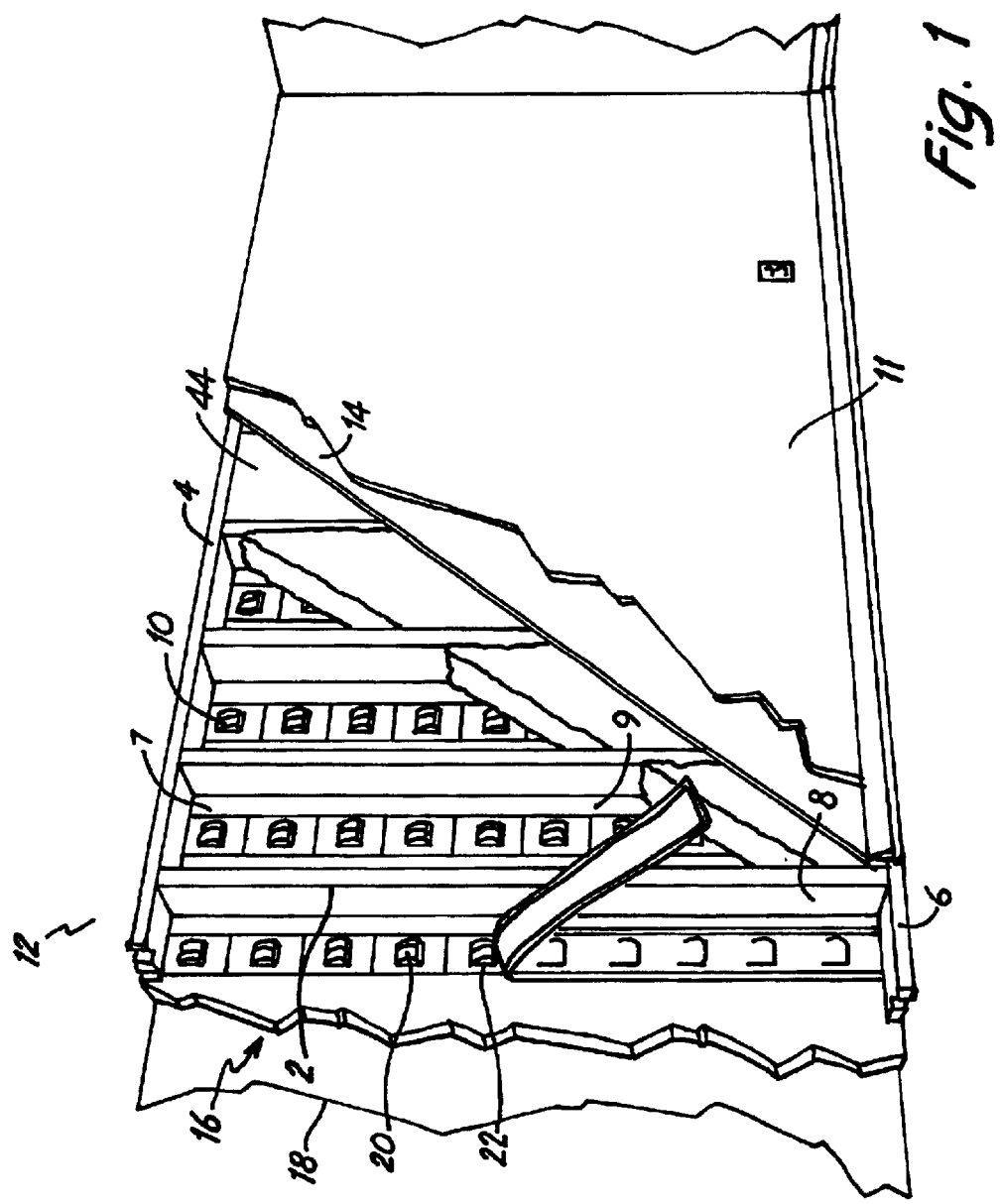
FIG. 1 is a perspective, partially sectional view of dual-stage desiccant satchels on desiccant strips attached to the interior side of the exterior sheathing of a wall cavity, according to one embodiment of the present invention.

FIG. 1 shows a typical wall assembly 12 with one embodiment of a desiccant strip 10 of the present invention installed to control moisture within a wall cavity 9. Each desiccant strip 10 is attached to a target surface 7 and has several permeable dual-stage desiccant satchels 20 containing desiccant 22. The desiccant 22 lowers the moisture level in the wall cavity 9 by permanently adsorbing moisture.

The wall assembly 12 may be found in various types of building construction (e.g., homes, office buildings, pre-assembled homes or other pre-assembled structures, commercial buildings, trailer homes, or any other type of building where moisture removal is an issue). Such a wall assembly 12 includes a frame 2 defined between a top plate 4 and a bottom plate 6, with a plurality of studs 8 extending therebetween. The rectangular cavities 9 defined within the wall assembly 12 are then enclosed on an interior side by a vapor barrier 14, which may be a polyethylene vapor barrier. Finish materials 11 such as drywall, plaster or other interior materials are then placed over the vapor barrier 14. On an opposite side of the wall assembly 12, an exterior sheathing 16 is attached and a housewrap 18 such as Tyvek (or any weather resistant barrier) may then be placed on top of the exterior sheathing 16. Brick, siding, or some other exterior finish materials may then be placed exterior to the housewrap. Once formed, the cavities 9 become generally water/moisture tight compartments, especially when both the vapor barrier 14 and the housewrap 18 are utilized. This provides excellent insulative benefits, reduces errant airflow, and also serves to further protect the materials used in construction from the elements.

In most cases where the exterior sheathing 16 represents an exterior wall exposed to the elements, insulation 44 is provided in the cavities 9 between adjacent studs 8. The insulation 44 can be provided in a batt, an elongated roll, or insulating material can be blown into the cavity 9.

One problem with making the cavity 9 restricted to airflow and generally moisture tight is that if moisture is introduced, it cannot escape; thus, mold growth is promoted. More and more municipalities are requiring the use of a vapor barrier 14 and housewrap 18. Thus, the potential for mold and moisture problems is likewise increasing. Unfortunately, a major source of moisture in cavities 9, especially in new buildings, is the lumber used to construct the wall assembly 12, such as top plates 4, bottom plates 6, and studs 8.

Lumber can absorb significant amounts of moisture prior to its introduction into the wall assembly 12. The kiln drying process at the lumber mill does not totally dry the lumber. During transport of the lumber to the suppliers and then to the end user, efforts to prevent moisture absorption are minimal. At the lumberyard, the lumber is typically stored outdoors under a tarp or roof at the mercy of the elements. Once the lumber reaches the jobsite, it is generally placed, uncovered, on the ground. Finally, until the roof is completed, the lumber typically continues to absorb moisture from rain, snow, or any other source after integration into the building construction.

Thus, lumber containing a large amount of moisture is often used to construct the wall assembly 12. After completion, as humidity levels stabilize and the wood naturally begins to dry, this moisture is released into the cavity 9. Because the cavity 9 is essentially moisture tight, the released moisture remains within the cavity 9, permanently raising the relative humidity level. This moist environment promotes mold growth, often to an extreme.

The same phenomenon occurs in interior wall assemblies 12 in which neither side of the wall is an exterior wall of the building. The moisture-tight seal in the interior wall is created by wall finish materials 11 such as paint or plaster. Once the seal is established, moisture released into the cavity 9 from the lumber in the wall assembly 12 is trapped, permanently raising the relative humidity level and thus promoting mold growth in the cavity 9 of the interior wall assembly 12.

I. Desiccant Strip

The desiccant strip 10 removes moisture from the wall cavity 9. The strip 10 is inserted into a wall cavity 9, where the desiccant 22 in the satchels 20 adsorbs moisture. Moisture is a necessary ingredient for mold growth. As the moisture level in the cavity 9 is reduced by the desiccant strip 10, mold growth is prevented. With proper use, desiccant strips 10 can prevent (or at least greatly reduce) mold growth in any building cavity.

As illustrated in FIG. 1, the dual-stage satchels 20 on the desiccant strips 10 are permeable containers. Each satchel 20 contains desiccant 22 that captures moisture through adsorption. Adsorption is the process of physically retaining a substance within another substance. Adsorption differs from absorption because while absorption involves chemical assimilation of the two substances, adsorption involves only the storage of one substance within another without changing the composition of either substance. The desiccant 22 adsorbs the moisture, holding it permanently in the satchel 20. When the level of moisture has been reduced to a certain level in the surrounding air, equilibrium capacity is reached and any additional amount of desiccant material will not lower the relative humidity. Equilibrium capacity is the level of moisture at which the unsaturated desiccant 22 cannot pull any more moisture from the air. The provided desiccant is sufficient to reduce the moisture levels to a point where mold growth is prevented.

Figure 2:
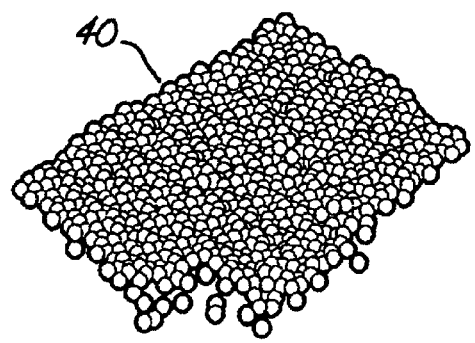
FIG. 2 illustrates a silica gel, according to one embodiment of the present invention.

Any material or combination of materials capable of adsorbing moisture can be used in the desiccant satchels 20. For example, such materials could include Type A silica gel ($SiO_2$), Type B silica gel, or any desiccant material such as: desiccant molecular sieves, Capsigels, desiccant clay, activated alumina (a highly porous form of aluminum oxide), calcium oxide (CaO), calcium sulfate ($CaSO_4$), and calcium chloride ($CaCl_2$). Silica gel 40 is depicted in FIG. 2. The terms "desiccant" or "desiccant material," as used in this specification, shall refer to any and all materials capable of adsorbing moisture, including those listed in this paragraph, unless otherwise specified.

Figure 3:
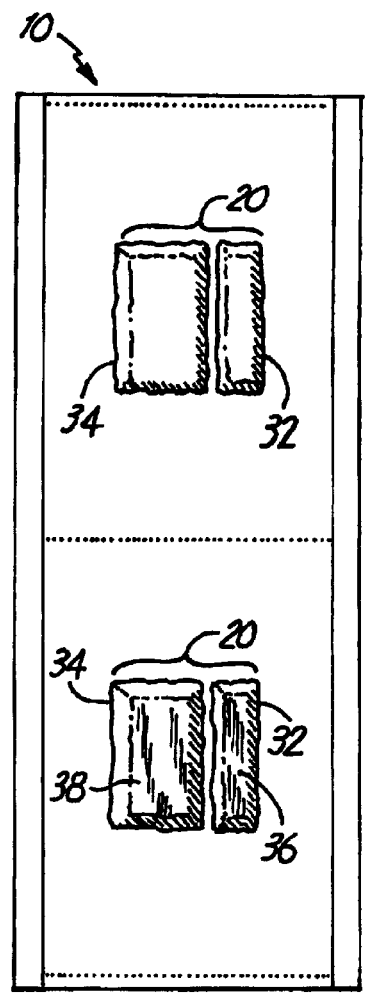
FIG. 3 is a front planar view of two dual-stage desiccant satchels on a portion of a desiccant strip, according to one embodiment of the present invention.

FIG. 3 is a front view of a portion of the desiccant strip 10. The strip 10 has two dual-stage satchels 20, but the length of the strip 10 and the number of satchels 20 can vary depending on the desired use. Each dual-stage satchel 20 is divided into two containers: a fast-acting desiccant container 32 and an extended duration desiccant container 34. The fast-acting desiccant container 32 holds a fast-acting desiccant 36 that adsorbs moisture at a faster rate than various other desiccants. For example, the fast-acting desiccant 36 may be silica gel, as depicted in FIG. 2. An extended duration desiccant container 34 holds an extended duration desiccant 38, e.g., calcium chloride, that adsorbs moisture at a slower rate, but for a longer period of time in comparison to various other desiccants. Certain extended duration desiccants 38 can adsorb moisture over a period of fifty days or more.

Figure 4:
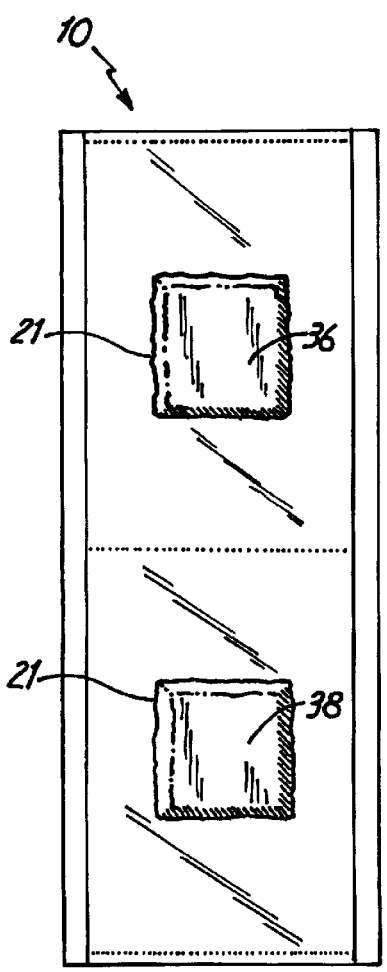
FIG. 4 is a front planar view of two single-stage desiccant satchels on a portion of a desiccant strip, according to one embodiment of the present invention.

An alternative desiccant strip 10 depicted in FIG. 4 includes a plurality of single-stage desiccant satchels 21. Only two satchels 21 are shown, but the length of the strip 10 and the number of satchels 21 will vary based on the desired use and the amount of adsorption anticipated. Some of the satchels 21 may contain fast-acting desiccant 36 and others may contain extended duration desiccant 38. In one embodiment, half of the satchels 21 on the strip 10 contain fast-acting desiccant 36 while the other half contain extended duration desiccant 38. Alternatively, all of the satchels 21 contain the same desiccant 22.

Figure 5:
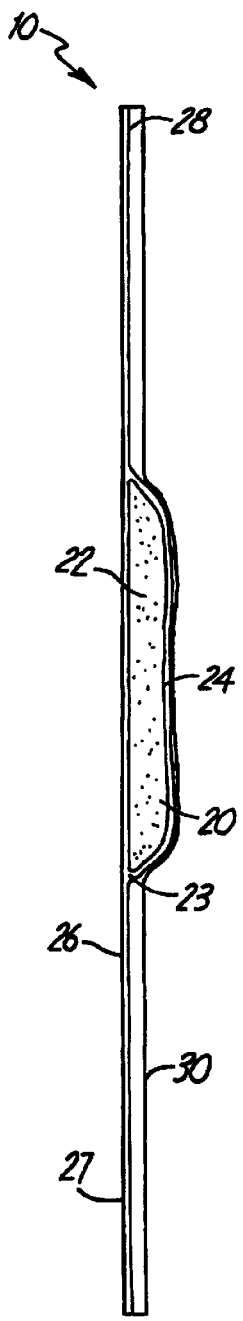
FIG. 5 is a side elevational view of a desiccant satchel on a portion of a desiccant strip, according to one embodiment of the present invention.

FIG. 5 is a side view of a portion of the desiccant strip 10. The satchel 20 includes permeable walls 24. The permeable walls 24 are constructed of a one-way permeable material. Alternatively, the permeable walls 24 are constructed of a two-way permeable material. The desiccant strip 10 has a base layer 26 that is a non-permeable back lining. The base layer 26 includes an adhesive 27 by which the desiccant strip 10 can adhere to objects. Alternatively, any coupling mechanism or method known in the art can be used to attach the desiccant strip 10 to a target object.

The desiccant strip 10 includes a permeable cover layer 28 opposite the base layer 26. The permeable cover layer 28 serves as an external cover to the satchel 20 while allowing accessibility to the satchel 20 for moisture adsorption. That is, in selected areas and intervals, the permeable cover layer 28 forms pockets 23 that contain the satchels 20. Advantageously, the base layer 26 and the permeable cover layer 28 serve as the walls of each satchel 20. In this embodiment, the permeable wall 24 of the satchel 20 is the permeable cover layer 28 and the opposing wall of the satchel 20 is the base layer 26. Thus, desiccant 22 is accessible through one permeable cover layer 28 rather than through both a permeable cover layer 28 and a permeable wall 24. A non-permeable lining 30 is removably attached to and covers the permeable cover layer 28. The non-permeable removable lining 30 protects the desiccant 22 in the satchel 20 from exposure to outside air and moisture prior to use of the desiccant strip 10. The non-permeable removable lining 30 is intended to be removed from the desiccant strip 10 within a short period of time prior to the sealing of the wall cavity 9 into which the strip 10 has been placed.

The permeable cover layer 28 is a permeable plastic material. For example, the plastic material can be woven olefin or an uncoated, high-density polyethylene material such as Tyvek. In another aspect of the invention, the cover layer 28 is a fabric or a paper. Examples of appropriate paper material include filter paper, Kraft/crepe paper, or any other permeable paper material capable of serving as the permeable cover layer 28. In embodiments in which the satchel 20 has permeable walls 24 independent of the base layer 26 and the permeable cover layer 28, the permeable walls can also be a permeable plastic material, a fabric, or a paper. In one embodiment, the base layer 26 is wax paper. Alternatively, the base layer 26 may be formed using a plastic, plasticized paper or any non-permeable material that can serve as a back-lining. Alternatively, the base layer may be permeable. The non-permeable removable lining 30 is made of non-permeable material similar to the base layer 26.

In another embodiment, the desiccant strip 10 is an adhesive strip with adhesive on both sides. On one side, loose desiccant 22 adheres to the adhesive while the adhesive on other side of the strip 10 can be used to adhere the strip 10 to a target surface 7.

The desiccant strip 10 may be made by placing desiccant 22 at regular intervals between a strip of base layer 26 and a strip of permeable cover layer 28, joining or sandwiching the base layer 26 and permeable cover layer 28 together to form satchels 20 of desiccant 22 where the desiccant 22 was placed, and sealing the base layer 26 and permeable cover layer 28 with a heat process to form the desiccant strip 10. For example, the strip 10 can be made using an apparatus that positions a web of base layer 26 next to a web of permeable cover layer 28, injects desiccant 22 at appropriate intervals along the length of the base layer 26 and cover layer 28, places the base layer 26 and cover layer 28 in contact to form satchels 20, and then applies heat to the base layer 26 and cover layer 28 such that the layers are sealed together to form the desiccant strip 10. Alternatively, the strips 10 can be made by any apparatus that provides for sealing desiccant 22 into satchels 20 at appropriate intervals along a length of a base layer 26 sealed to a permeable cover layer 28. In another embodiment, the satchels 20 are made by sealing desiccant in a permeable pouch, and then the satchels 20 are sealed between a strip of base layer 26 and a strip of cover layer 28. In another aspect of the present invention, the strip 10 can be made by adhering loose desiccant 22 to one side of an adhesive strip with adhesive on both sides.

In use, one or more desiccant strips 10 are placed in each of the wall cavities 9 to control the moisture level. In the case where moisture is introduced from the lumber used, the cavities 9 are generally moisture tight; thus, no additional moisture should be introduced and the problem is permanently eliminated. In order to accomplish the adsorption of a sufficient amount of moisture to prevent subsequent mold growth, a sufficient quantity of the desiccant material 22 is provided within each wall cavity 9 to adsorb at least the anticipated level of moisture expelled from the lumber. In some cases, sufficient quantities of desiccant may be provided to adsorb more than an anticipated level of moisture. Of course, there may be situations where moisture is introduced in other ways over time and as explained in greater detail below, the present invention is useful in addressing those issues as well.

Referring again to FIG. 1, the desiccant strips 10 are placed on the target surface 7 within the wall cavity 9 prior to the creation of the airtight "envelope" of the wall cavity 9. The envelope is created when the vapor barrier 14, the exterior sheathing 16, and the housewrap 18 are added to the wall assembly 12, thereby sealing the wall cavity 9. Adhesive 27 on the back layer 26 of the desiccant strips 10 is used to attach the strips 10 to the target surface 7. The target surface 7 could be the exterior sheathing 16. Just prior to the sealing of the wall cavity 9 or installing the insulation 44, which will obscure the desiccant strips 10 attached to the exterior sheathing 16, the non-permeable removable lining 30 is removed from each desiccant strip 10. If the wall assembly 12 is an interior wall, insulation may not be necessary, so the strips 10 may be attached to a target surface 7 and then the wall cavity 9 may be sealed. If the wall assembly 12 is an exterior wall of the building, insulation may be inserted into the cavity 9 after the strips 10 have been attached to the target surface 7. The entire removable lining 30 is pulled from each strip 10, thus exposing the desiccant material 22 in the permeable satchels 20 to the air. Once the wall cavity 9 is sealed, the moisture released from the construction materials within the cavity 9 is trapped within the envelope and the desiccant 22 in the satchels 20 begins to adsorb the trapped moisture. Thus, moisture within the sealed cavity 9 is not allowed to reach a level where mold growth is facilitated, thus eliminating the problems associated with the presence of mold in building cavities.

Figure 6:
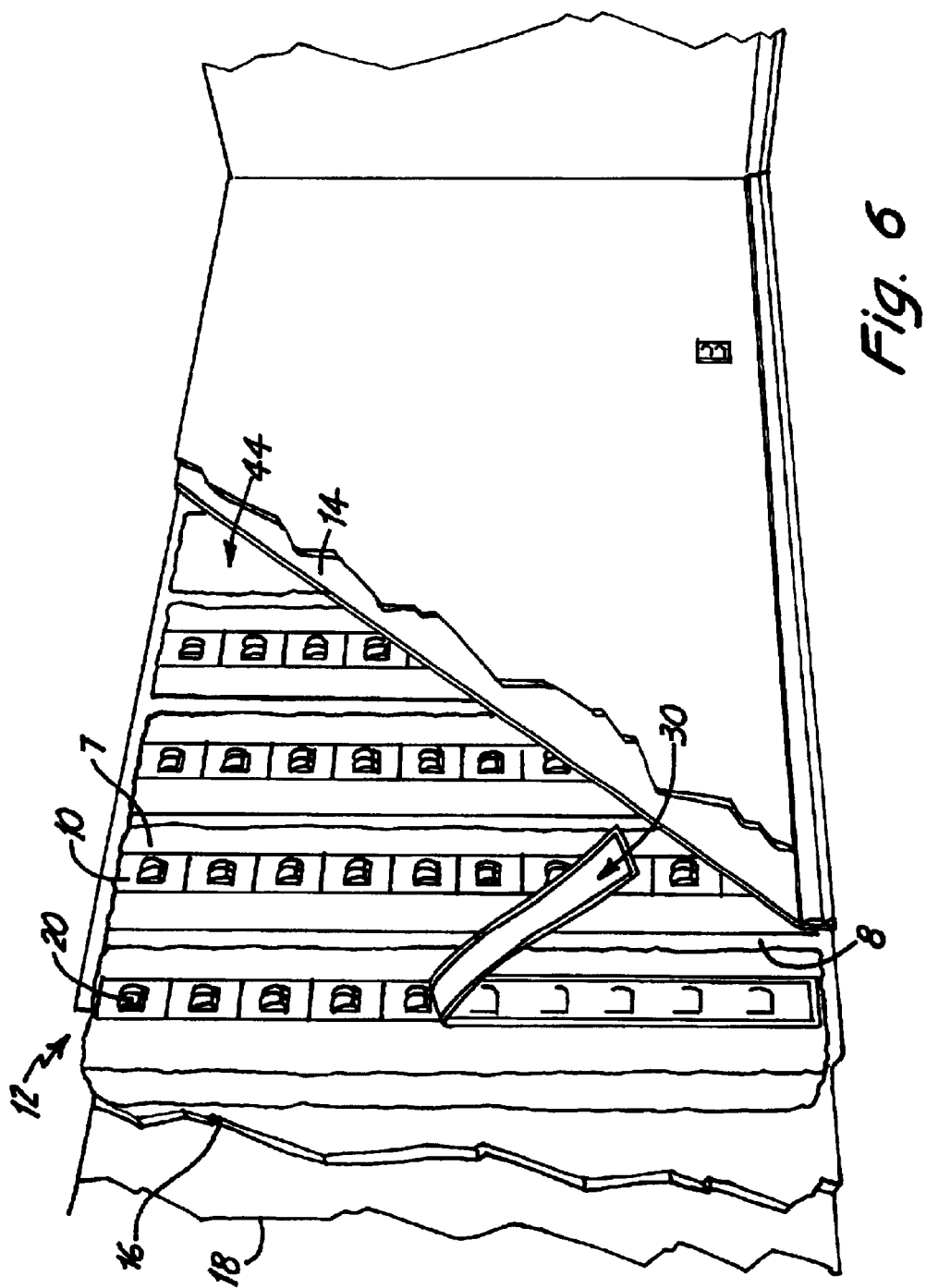
FIG. 6 is a perspective view of dual-stage desiccant satchels on desiccant strips attached to insulation in a wall cavity, according to one embodiment of the present invention.

FIG. 6 is a perspective view illustrating the use of desiccant strips 10 in a wall cavity 9. The desiccant strips 10 are attached to the target surface 7, which in this case is the insulation 44 in the wall cavity 9. The strips 10 may be attached to the insulation 44 to reduce installation times (combining two steps into one) or if it is desirable to place the insulation 44 in the wall cavity 9 prior to, or at the same time as, the placement of the strips 10. Alternatively, the target surface 7 is another surface such as the broad side of the studs 8. The desiccant strips 10 may be attached to the insulation 44 prior to the placement of the insulation 44 into the wall cavity 9, because the target surface 7 may be difficult to access after the insulation 44 has been placed in the wall cavity 9. The desiccant strips 10 may even be attached to the insulation 44 prior to delivery of the insulation materials to the construction site, for efficiency and ease of transportation. Alternatively, the desiccant strips 10 are attached to the insulation 44 after delivery to the construction site but prior to placement of the insulation 44 into the wall cavity 9, for greater flexibility regarding the number of satchels 20 required based on the size of the target cavities 9. In addition, the desiccant strips 10 could be attached to the insulation 44 after the insulation 44 has been placed in the wall cavity 9.

Desiccant strips 10 are generally used in new construction. Each strip 10 is attached to target surfaces 7 in wall cavities 9 during the construction of a new building. Prior to sealing each new wall cavity 9, the non-permeable removable lining 30 is removed from each strip 10, making the desiccant 22 accessible to any moisture present in the cavity 9 after it has been sealed. Alternatively, the strips 10 are used in pre-existing construction. During remodeling or other alteration of an existing building, desiccant strips 10 are attached to target surfaces 7 in newly-exposed, pre-existing wall cavities 9 or newly-added cavities 9 and the removable lining 30 is removed from the strip 10 prior to sealing or re-sealing the cavity 9. Whether the wall assembly 12 is new or pre-existing, the desiccant strips 10 reduce or control the level of moisture in the wall cavities 9, thus providing an inexpensive and simple system for preventing or eliminating mold growth in the wall cavities 9.

II. Desiccant Implant

Figure 7:
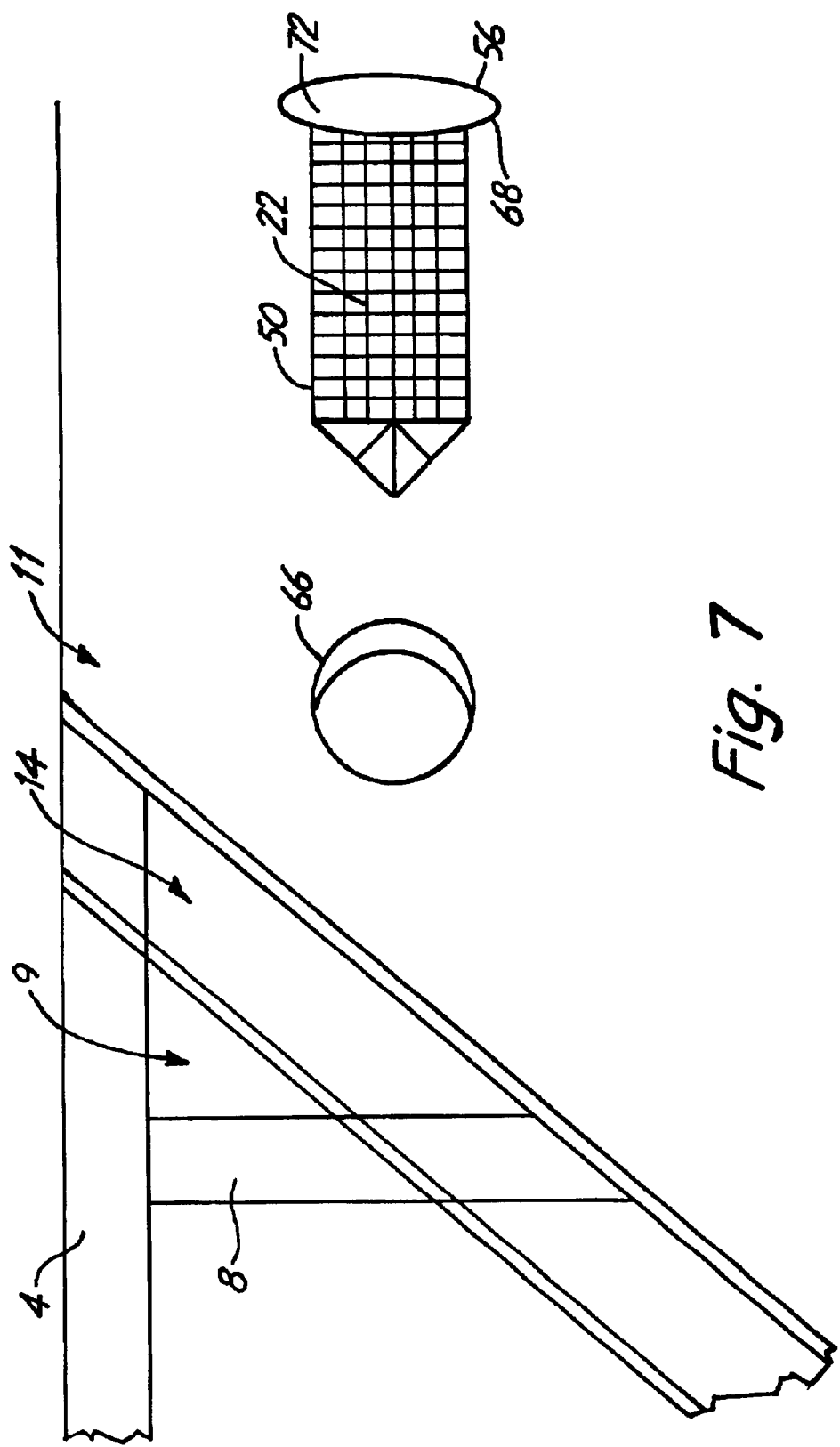
FIG. 7 is a perspective view of a desiccant implant being inserted into a hole in finish materials, according to one embodiment of the present invention.

The desiccant implant 50 depicted in FIG. 7 addresses moisture accumulation and mold in pre-existing wall cavities 9. The implant 50 is filled with desiccant 22 and inserted through a hole 66 in a pre-existing wall assembly 12. Moisture within the cavity 9 is then adsorbed by the desiccant in the implant 50. Even if a pre-existing cavity 9 is generally air tight and moisture tight as a result of the seal created by the vapor barrier 14, exterior sheathing 16, and housewrap 18 that enclose the cavity 9, a moisture level conducive to mold growth can be trapped in the pre-existing cavity 9 when the cavity 9 is first sealed during new construction and desiccant strips 10 were not used. As explained above, the moisture may originate in the building materials, including the studs 8, used to construct the wall assembly 12. Alternatively, moisture may continually accumulate in a cavity 9 as a result of some construction or structural failure or even through an intended opening (e.g., an electrical outlet) cut into the wall cavity 9. The difficulty is detecting, reducing, or eliminating the level of moisture and the mold without extensive repair or remodeling. Removing entire sections of wall assemblies 12 in order to address moisture and mold problems in wall cavities 9 is expensive and inconvenient. Consequently, a device that helps address moisture and mold problems in wall cavities after enclosure is desirable.

The desiccant implant 50 addresses the problem of moisture and mold in pre-existing cavities 9 by allowing for moisture level detection, reduction, and control with a minimum of expense or alteration to the existing wall assemblies 12. The desiccant implant 50 is a permeable, generally cylindrical construct that can be filled with a desiccant 22. The implant 50, containing desiccant 22, is inserted into a pre-existing wall cavity 9 through an implant hole 66 drilled into the wall finish materials 70.

Figure 8:
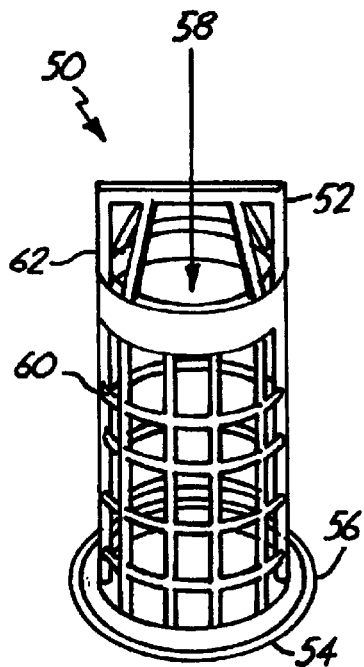
FIG. 8 is a perspective view of a desiccant implant, according to one embodiment of the present invention.
Figure 9:
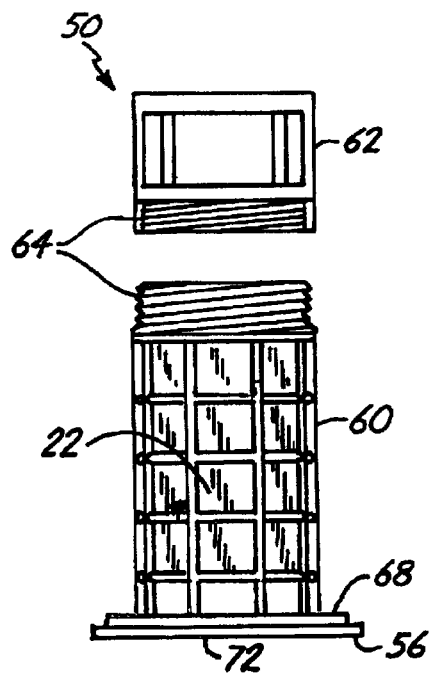
FIG. 9 is a front planar view of a desiccant implant with an unattached threaded cap, according to one embodiment of the present invention.

As depicted in FIGS. 8 and 9, the implant 50 has an implant cavity 58 capable of holding desiccant 22. The desiccant can be inserted into the cavity 58 by removing the implant cap 62, which is attached to the implant body 60 with threads 64, and inserting the desiccant into the body 60. The distal end 52 of the implant 50 is wedge-shaped to provide for easy insertion into the implant hole 66. The proximal end 54 of the desiccant implant 50 has a faceplate 72 with a flange 56 extending beyond a diameter of the body 60 of the desiccant implant 50 to prevent the implant 50 from passing entirely through the implant hole 66 and falling into the wall cavity 9. The faceplate 72 can be transparent, allowing for examination of the desiccant 22. Alternatively, the faceplate 72 is opaque.

The implant 50 may be made of a plastic material. Some examples of an appropriate plastic include polyethylene, polypropylene, or a nylon. The faceplate 72 can be a transparent material, such as plexiglass or a clear plastic. In one aspect of the present invention, the plastic is oven and microwave-safe. The plastic implant 50 may be made by an injection molding process or portions of the implant 50 may be extruded. In another embodiment, the implant 50 is a molded ceramic material, a casted metal such as aluminum, or a casted metal with a ceramic coating.

Figure 10:
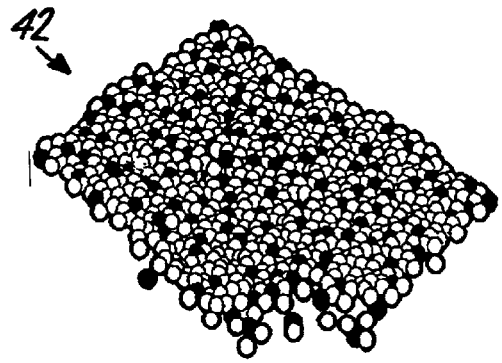
FIG. 10 illustrates a mixture of desiccant comprising ten percent indicating silica gel in non-indicating silica gel.

The implant cavity 58 may be filled with a mixture 42 of indicating and non-indicating desiccant as depicted in FIG. 10. An indicating desiccant is a desiccant that indicates the amount of moisture it has adsorbed. A typical indicating desiccant is one that changes color to indicate moisture content. For example, in one embodiment the indicating desiccant is blue when void of moisture and exhibits a gradient of color for varying levels of moisture that becomes a contrasting color such as red when the desiccant is saturated. Indicating desiccants include, but are not limited to, indicating Type A silica gel or indicating Type B silica gel. Generally, given the higher price of the indicating desiccants, it may be more economical to mix the two types of desiccants to reduce costs while using sufficient amounts of an indicating desiccant to provide the user with an indication that moisture is present. The mixture 42 has a ratio of indicating desiccant to non-indicating desiccant material of 1:10. Alternatively, the ratio can be any ratio that allows both adsorption and indication. In an alternate embodiment, the implant cavity 58 can be filled entirely with an indicating or non-indicating desiccant material. In another aspect of the invention, the implant cavity 58 can be filled with some material for testing for the presence of mold. Alternatively, the material is any type of media indicator.

The size of the implant 50 can be varied as desired. For example, with wall cavities with 2×4 studs 8, the implant 50 may have a diameter of 1.5 inches and a length of 3.5 inches. For wall cavities with 2×6 studs or larger, the implant can have a length of 5.5 inches. Further, the implant 50 can be filled with desiccant 22, or, alternatively, the desiccant 22 is first placed into a permeable container (not shown) and then the permeable container is inserted into the implant cavity 58. In addition to threads, the implant cap 62 can be attached to the implant body 60 by any attachment mechanism, such as snaps, clips, or fasteners. The distal end 52 as depicted in FIG. 7 as wedge-shaped, but an alternate embodiment is a rounded distal end (not shown). The distal end 52 could have any shape that assists in or promotes the insertion of the implant 50 as described below.

Returning to FIG. 7, the implant can be inserted into the wall cavity 9 from the exterior side (not shown) of the wall assembly 12 through an implant hole 66 drilled in exterior wall finish materials. For insertion from the exterior side, the exterior finish materials may be removed or simply lifted in a desirable location, the housewrap 18 opened or lifted, and an implant hole 66 drilled into the cavity 9. The hole 66 may also be drilled directly through the exterior finish materials, the housewrap 18, and the exterior sheathing 16. Alternatively, the implant is inserted from the interior side 11 through an implant hole 66 drilled in interior finish materials 11.

Once the implant 50 is in the implant hole 66, the desiccant 22 in the implant 50 adsorbs moisture in the cavity 9. Due to its small size and method of use, the implant 50 can remove problem moisture without damaging large amounts of the pre-existing construction. That is, the moisture levels in a pre-existing cavity 9 can be successfully reduced or eliminated by simply drilling a small hole 66 in an inconspicuous location in the wall finish materials 70 and inserting the implant 50 into the hole 66. After use, the hole can easily be repaired or the implant 50 can remain in place, either being covered over, or having a suitable appearance to remain uncovered. The desiccant implant 50 filled with desiccant 22 may be reusable. More particularly, the desiccant itself may be processed to void the moisture from the desiccant 22. Moisture can be removed from desiccant 22 by applying heat to the desiccant 22. The desiccant 22 is removed from the implant 50 and the moisture is baked out of the desiccant 22. The moisture is removed by baking the desiccant 22 in a conventional oven, or alternatively, by placing the desiccant 22 in a microwave oven. Alternatively, the saturated desiccant 22 is left in the desiccant implant 50 and the moisture is removed from the desiccant 22 by applying heat to the implant 50. The desiccant implant 50 filled with saturated desiccant 22 is placed in a conventional oven or alternatively in a microwave oven to void the desiccant 22 of moisture.

The implant 50 can be used for moisture detection. As depicted in FIG. 7, the implant 50 is introduced into the implant hole 66 and left in position for a pre-determined period of time before being removed. Once the pre-determined period of time has passed, the implant 50 is removed from the hole 66. After removal, the desiccant 22 in the implant 50 is examined to determine the level of moisture in the wall cavity 9. Alternatively, the indicating desiccant can be examined through the transparent faceplate 72 without having to remove the implant 50 from the hole 66. The amount of moisture present is determined by the type of indicating desiccant used and the amount of color change (or other type of indication) over the pre-determined period of time. If the indicating desiccant in the implant 50 has not changed color, the wall cavity 9 contains little or no moisture. If the indicating desiccant has changed color, the amount of change and rate of speed of the change can indicate the level of moisture in the wall cavity 9.

The implant 50 can be used for moisture reduction or elimination. Moisture reduction may be desirable because the moisture level is known to be at an undesirable level or because a previously-inserted implant 50 indicated as much. The implant 50, filled with a desiccant 22, is inserted into the implant hole 66. Upon saturation, the implant 50 is removed, voided of moisture, and re-inserted into the implant hole 66. Alternatively, another implant 50 with desiccant 22 is inserted in its place. In a further alternative, more implant holes 66 are drilled into the wall cavity 9 and more implants 50 are inserted into the cavity 9. The re-insertion or replacement of the implant 50 at pre-determined intervals continues until the moisture level has reached a desired level or equilibrium capacity. Alternatively, the repeated use and saturation of the implant 50 may indicate that there is a failure in the construction or other problem allowing moisture into the target cavity 9, thus indicating that the construction failure or problem must be corrected before the moisture problem can be resolved.

Several factors may be considered in determining the pre-determined period of time that an implant 50 remains in the implant hole 66 for moisture detection. The type of indicating desiccant, the percentage of indicating desiccant in a mixture with non-indicating desiccant, or the size of the implant can impact the rate and extent that the desiccant or mixture changes color or otherwise indicates the presence of moisture. The amount of moisture anticipated to be present in the wall cavity 9 and the type of wall cavity 9 are factors. If it is expected that the wall cavity 9 has a high moisture content, the pre-determined time before removal may be shorter than if it is anticipated that the wall cavity 9 is relatively dry.

The desiccant implant 50 could be placed permanently into the wall finish materials 70 and wall cavity 9. The implant 50 is filled with an extended duration desiccant 22 that is permanently affixed in the implant hole 66. The implant 50 is permanently affixed using a long-lasting glue or sealant 68. Alternatively, the implant 50 is permanently affixed using some attachment apparatus such as nails, or tacks.

The flange 56 on the implant 50 may have a sealing compound or similar sealant 68 to create a seal between the flange 56 and the finish materials 11. The resulting seal prevents air and moisture from entering the wall cavity 6 through any space between the desiccant implant 50 and the wall finish materials 11.

III. Insulation/Desiccant Mixture

A mixture of loose insulation and desiccant is also provided for use in cavities 9. The desiccant mixture 80 can be blown into a cavity, thus providing desiccant to adsorb any moisture within the cavity.

Figure 11:
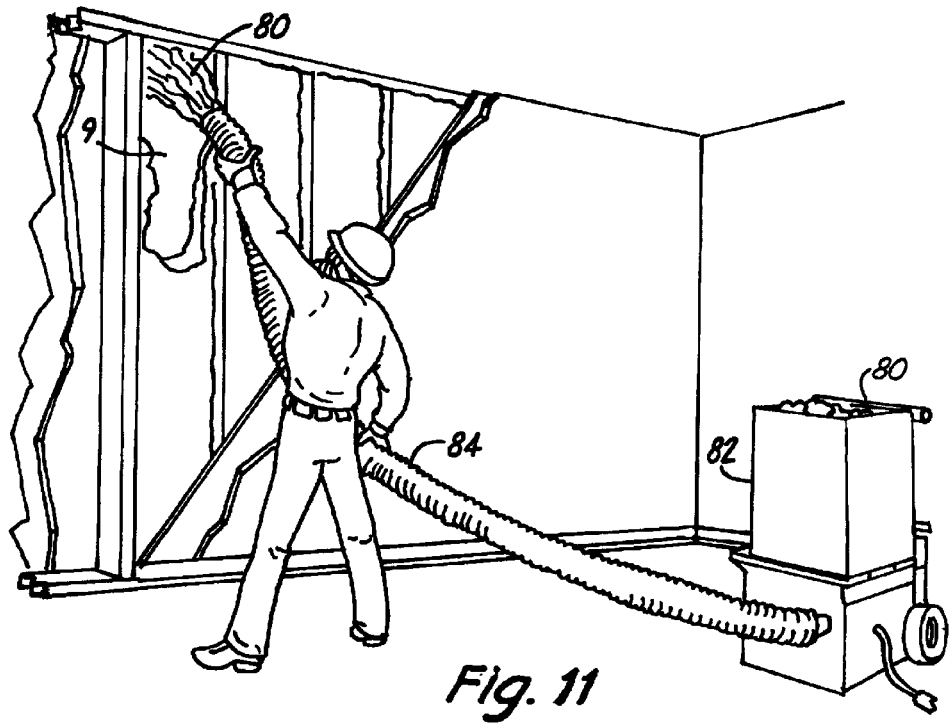
FIG. 11 is a perspective view of desiccant and insulation being blown into a wall cavity during new construction, according to one embodiment of the present invention.

FIG. 11 is a perspective view of a mixture 80 of loose insulation and desiccant being blown into a wall cavity 9 in new construction. Any desiccant material or combination of desiccant materials capable of adsorbing moisture can be used in the insulation/desiccant mixture 80. The insulation/desiccant mixture 80 can be created quickly and efficiently, simply mixing the desired ratio of insulation and desiccant and blowing it into the cavity 9. For efficiency and ease of transportation, the insulation/desiccant mixture 80 may be created prior to delivery of the insulation to the construction site. Alternatively, the insulation/desiccant mixture 80 is created after delivery of the insulation to the construction site in order to provide flexibility; i.e., the ratio of insulation to desiccant can be changed based on the conditions for use.

In use, an insulation/desiccant mixture 80 is generally blown into a wall cavity 9 or other type of cavity, such as in or around a roof. The mixture 80 is placed into an insulation blowing machine 82. A hose 84 attached to the insulation blowing machine 82 can be used to direct the insulation/desiccant mixture 80 into the desired areas of the wall cavity 9 of new construction prior to sealing the structural cavity. Once the wall cavity 9 has been sealed, the desiccant in the mixture 80 adsorbs moisture, thus reducing the level of moisture present in the cavity 9 and therefore reducing the presence of mold in the cavity 9.

Figure 12:
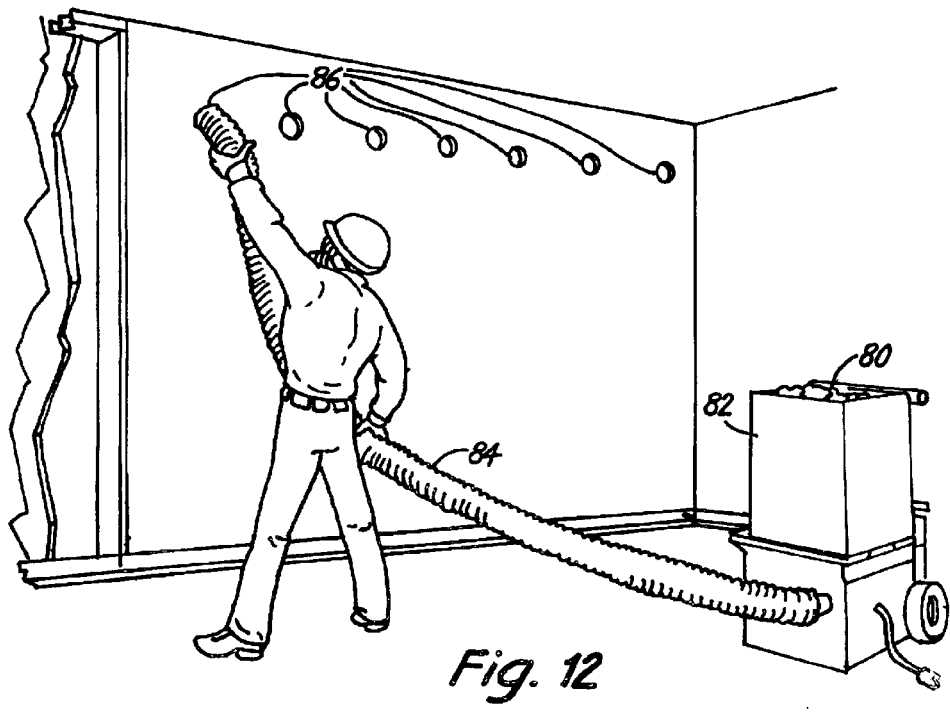
FIG. 12 is a perspective view of desiccant and insulation being blown into an existing wall cavity, according to one embodiment of the present invention.

As illustrated in FIG. 12, the insulation/desiccant mixture 80 can be blown into a wall cavity 9 in pre-existing construction. The mixture 80 is placed into an insulation blowing machine 80 and directed into a wall cavity 9 through a hose 84 attached to the insulation blowing machine. For pre-existing construction, an access hole 86 is bored into the pre-existing structural finish materials to provide access to the wall cavity 9. The insulation/desiccant mixture 80 is blown into the target cavity by inserting the hose 84 into the access hole 86. Access holes 86 may be bored into the pre-existing structural finish material to coincide to each cavity created by the structural supports such as wall studs, and the mixture 80 is blown into each cavity 9. After the cavities 9 have been filled with the mixture 80, the access holes 86 are plugged or closed.

IV. Insulation/Desiccant Structure

According to another embodiment, an insulation/desiccant structure is provided for use in wall cavities 9. Any desiccant 22 or combination of desiccants 22 capable of adsorbing moisture can be used in the insulation/desiccant structure. The apparatus is created by integrating desiccant 22 into a common insulation roll or batt. An insulation roll or batt is a strip of insulation which may have a paper backing. In use, the insulation/desiccant structure is inserted into the wall cavity 9 prior to sealing the cavity 9 closed. The desiccant 22 in the structure is capable of adsorbing moisture present inside the wall cavity 9. Alternatively, the desiccant 22 can be integrated into the paper backing on the insulation batt or roll.

V. Desiccant Package

An alternate aspect of the invention is a desiccant package: a package of desiccant material for controlling moisture levels in building cavities 9. The desiccant package (not shown) is placed inside the building cavity 9. Alternatively, the package may be hung or otherwise affixed inside the building cavity 9. The desiccant package may be a cloth bag containing desiccant. Alternatively, the desiccant package is any permeable packaging material capable of permitting moisture access to the desiccant included therein, including cardboard, plastic, metal, etc. The package, furthermore, can be a box, canister, or any other container capable of holding substantial amounts of desiccant. In some embodiments, several desiccant packages may be placed in a cavity 9.

VI. Desiccant Jamb Strip and Jamb Plug

Figure 13:
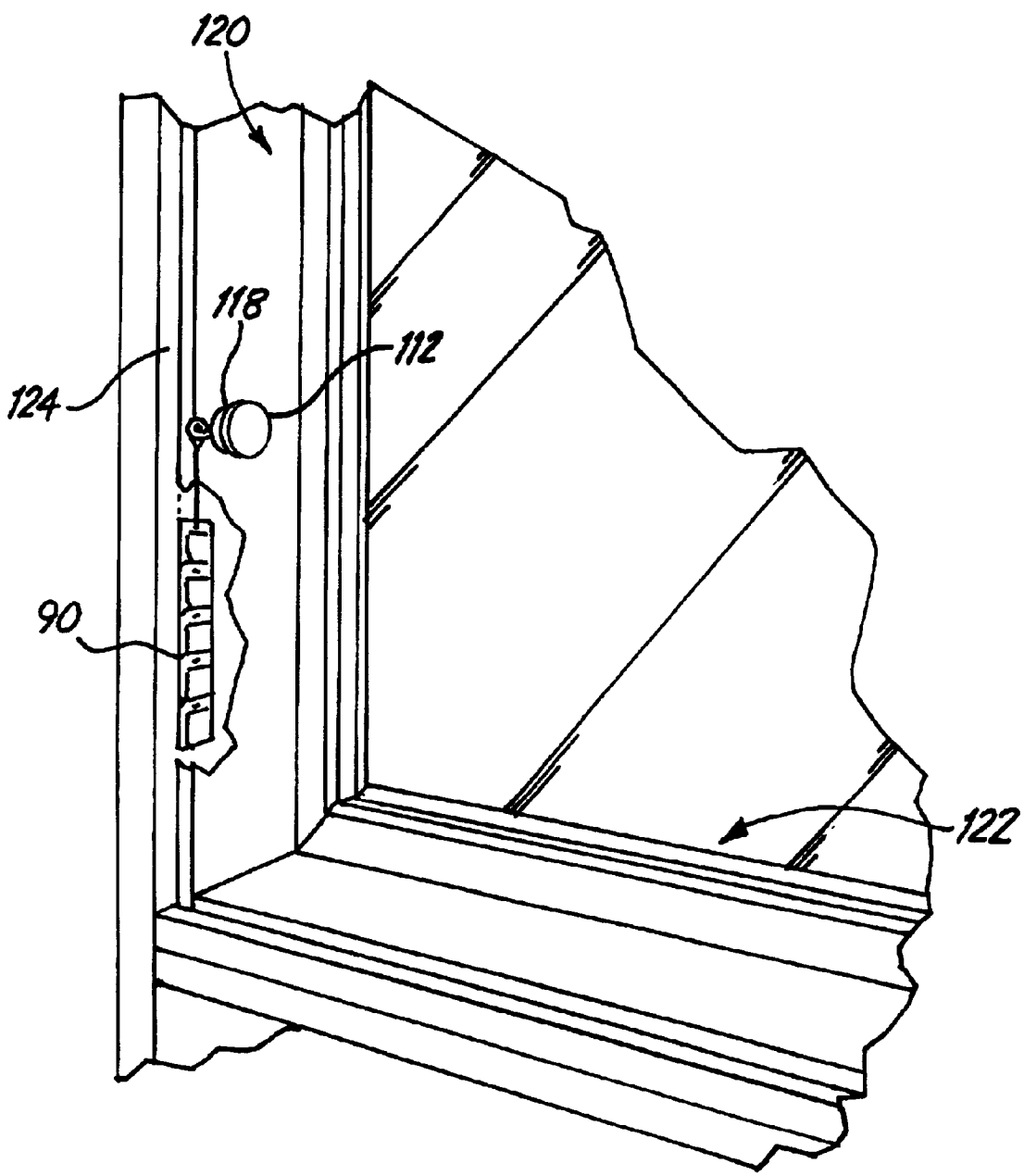
FIG. 13 is a perspective view of a desiccant jamb strip coupled to a jamb plug in use in a fenestration cavity, according to one embodiment of the present invention.

For some building and wall cavities 9, a desiccant jamb strip 90 and jamb plug 112 as depicted in FIG. 13 may be used. A jamb strip 90 can be inserted through a hole into a fenestration cavity 124 or wall cavity 9 and hung from a plug 112 inserted into the hole. Desiccant 22 within the jamb strip 90 adsorbs moisture within the cavity.

Fenestration cavities 124 present a different situation than other types of building cavities 9. The fenestration cavities 124 are smaller and relatively more inaccessible than wall or other building cavities 9. Yet, as with more accessible cavities 9, fenestration cavities 124, door cavities (not shown), and other inaccessible cavities may have moisture levels conducive to mold growth. Due to the limited access, moisture in a fenestration cavity 124 or other relatively inaccessible cavity 9 can be removed by boring a minimal number of jamb strip holes 118 into the cavity 124 (preferably only one hole in some instances) and inserting a substantial amount of desiccant in jamb strip 90 form. The jamb strip 90 can be varied in length and amount of desiccant, and can be inserted through a single hole 118 and hung inside the target cavity 124.

FIG. 14 is a front view of a desiccant jamb strip 90. The jamb strip 90 includes five desiccant jamb satchels 92. The number of satchels 92 in a jamb strip can vary depending on desired length or the number of satchels 92 that the target cavity 9 is capable of holding. Each jamb satchel 92 is a permeable container containing desiccant 22 accessible to moisture in the surrounding air. As previously described, each satchel 92 can contain any desiccant 22 or mixture of desiccants 22, including indicating desiccants. The jamb strip 90 may include a non-permeable removable lining (not shown) attached to the satchels 92 and intended to make the desiccant inaccessible to the air until removal of the lining just prior to insertion of the jamb strip 90 into a target cavity 9.

The satchels 92 are made of a permeable plastic material. For example, the plastic material can be woven olefin or an uncoated, high-density polyethylene material such as Tyvek. In another aspect of the invention, the satchel 28 is a fabric or a paper. Examples of appropriate paper material include filter paper, Kraft/crepe paper, or any other permeable paper material capable of serving as the permeable cover layer 28. In embodiments in which the desiccant 22 is enclosed between two strips of plastic, at least one sheet is also a permeable plastic material, a fabric, or a paper. Alternatively, one strip is wax paper. In another aspect, one strip is a plastic, plasticized paper, or any non-permeable material that can serve as a lining.

According to one embodiment, the jamb strip 90 is made in a fashion similar to the desiccant strip 10. Desiccant 22 is placed at regular intervals between two strips of plastic, at least one of which is permeable. The two strips of plastic are joined or sandwiched together to form satchels 92 of desiccant 22 where the desiccant 22 was placed. The two strips are then sealed together with a heat process to form the desiccant jamb strip 90. Alternatively, the strips 90 can be made by any apparatus that provides for sealing desiccant 22 into satchels 92 at appropriate intervals between two strips of plastic. In another embodiment, the satchels 92 are made by sealing desiccant in a permeable pouch, and then the satchels 20 are sealed between two strips of plastic.

The jamb strip 90 attaches to a jamb plug 112 as depicted in FIG. 15. The jamb plug 112 is a generally cylindrical body. Alternatively, the plug 112 is any shape desirable to fill the hole 118 created for insertion of the jamb strip 90. The desiccant jamb strip 90 is connected to the jamb plug 112 via a string member 114 between the jamb strip 90 and the plug 112. The string member 114 may be, for example, a string, cord, cable, or any other length of material for connecting objects. The string member 114 is connected to a jamb hook 116 that is coupled with the jamb plug 112 or alternatively by a clip, an eyelet, or a clamp. The jamb hook 116 is located on the distal end 117 of the jamb plug 112. The string member 114 may be removable from the jamb hook 116.

Figure 16:
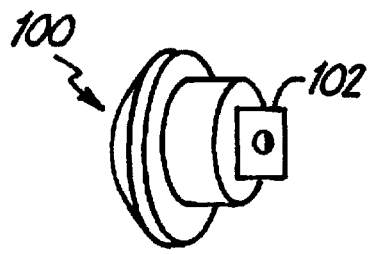
FIG. 16 is a perspective view of a wood jamb plug, according to one embodiment of the present invention.
Figure 17:
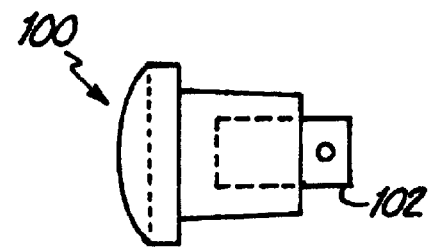
FIG. 17 is a side elevational view of a wood jamb plug, according to one embodiment of the present invention.
Figure 18:
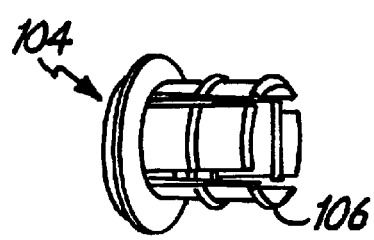
FIG. 18 is a perspective view of a plastic jamb plug, according to one embodiment of the present invention.
Figure 19:
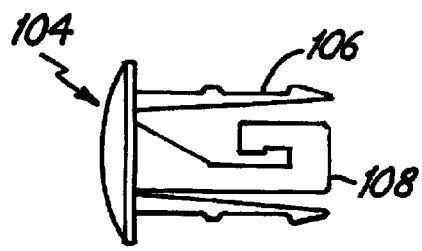
FIG. 19 is a side view of a plastic jamb plug, according to one embodiment of the present invention.
Figure 20:
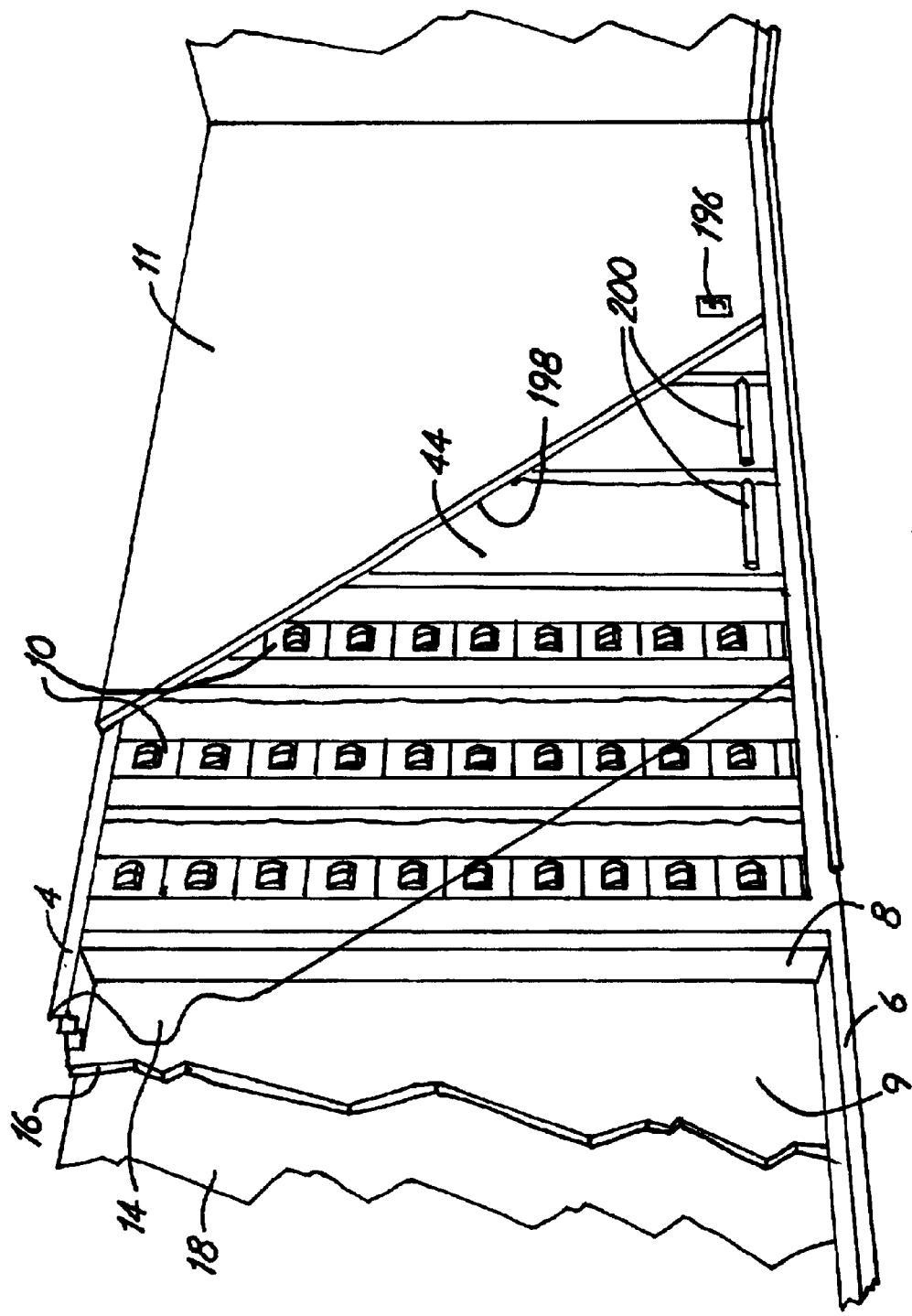
FIG. 20 is a perspective, partially sectional view of an interior wall cavity with a plurality of barrier strips affixed to the vapor barrier, according to one embodiment of the present invention.

The jamb plug 112 may be a wood jamb plug 100 as depicted in FIGS. 16 and 17. The jamb plug 100 has an attachment tang 102 extending from the distal end X of the plug 100. The desiccant jamb strip 90 attaches to the jamb plug 100 at the attachment tang 102. Alternatively, the jamb plug 112 may be a plastic jamb plug 104 as depicted in FIGS. 19 and 20. The jamb plug 104 has attachment tabs 106 extending from the distal end of the plug 104. The attachment tabs 106 expand circumferentially to hold the jamb plug 104 upon insertion into the strip hole 118. The desiccant jamb strip 90 attaches to the jamb plug 104 at an attachment hook 108 extending from the distal end of the plug 104. In one aspect of the present invention, the desiccant jamb strip 90 is detachable from the jamb plug 112.

Returning to FIG. 13, a jamb strip hole 118 is drilled into an extension jamb 120. Alternatively, the hole 118 is drilled into the window body 122, a door body, or any other building structure with a cavity. The desiccant jamb strip 90 is inserted into the target fenestration cavity 124 through the strip hole 118 and hangs from the jamb plug 112. The jamb plug 112 fits snugly into and covers the hole 118 while suspending the jamb strip 110 in the fenestration cavity 124. Upon plugging the hole 118 with the jamb plug 112, the desiccant 22 in the jamb satchels 92 begins to adsorb the moisture present in the fenestration cavity 124, thus reducing or eliminating any moisture present in the cavity 124.

The desiccant jamb strip 90 attached to the plug 112 is reusable. The jamb strip 90 and plug 112 can be removed from the cavity 124 and heated to void the desiccant 22 of moisture. After voiding, the jamb strip 90 and plug 112 are again placed into their previous position. Alternatively, the jamb strip 90 is examined upon removal from the cavity 124 to determine the level of moisture in the cavity 124. If the desiccant 22 in the strip 90 indicates saturation of the desiccant 22 or some moisture level that requires further adsorption, the strip 90 is heated to void the moisture and the strip 90 and plug 112 are reinserted into the cavity 124. If the desiccant 22 indicates a desired low level of moisture or equilibrium capacity, the strip 90 is voided of moisture and the strip 90 and plug 112 are permanently re-inserted into the cavity 124. Alternatively, if the desired level of moisture is reached, the strip hole 118 may be permanently covered or sealed.

VII. Desiccant Barrier Strip

Referring to FIG. 20, another cavity, the barrier cavity 198, exists between the installed vapor barrier 14 and the drywall 11 (representative of any finish material). A desiccant barrier strip 200 containing desiccant 22 can be inserted into the barrier cavity 198. The desiccant 22 within the strip 200 adsorbs moisture, thus reducing the moisture level within the barrier cavity 198.

Because the drywall 11 is often painted or covered, it also becomes impermeable to moisture, allowing moisture within the barrier cavity 198 to become trapped. Thus, any moisture that is trapped within this barrier cavity 198 has a tendency to condense on the vapor barrier 14 and run towards the base plate (or sill plate) 6. Therefore, it is common to see mold growth near the bottom portions of walls due to this phenomenon. In addition to moisture that may be trapped within the barrier cavity 198 from construction, moisture may be introduced into the barrier cavity 198 through any openings, such as an outlet 196, that are cut through the drywall 11. Moisture from the room may enter the barrier cavity 198 through any such opening, effectively become trapped within, and either condense on the vapor barrier 14 or raise the humidity level within the wall cavity 9, lending to an environment conducive to mold growth.

While the wall cavity desiccant strips 10 are effective at removing moisture from the wall cavity 9, they will have no effect on the barrier cavity 198 between the vapor barrier 14 and the drywall 11, because the wall cavity 9 and the barrier cavity 198 are separated by a moisture tight seal created by the vapor barrier 14. Thus, prior to installing the drywall 11, one or more desiccant barrier strips 200 can be applied to the vapor barrier 14. The barrier strips 200 are similar to the desiccant strips 200 in that they contain one or more types of desiccant material to permanently remove moisture from their exposed surroundings.

Figure 22:
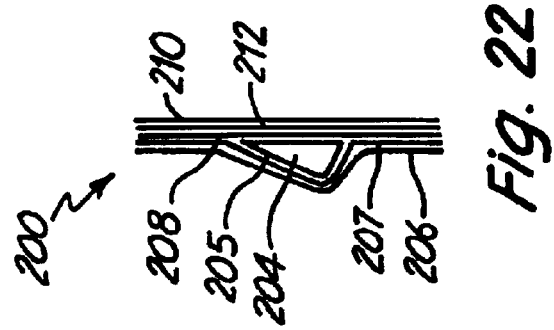
FIG. 22 is a side elevational view of a barrier strip, according to one embodiment of the present invention.
Figure 21:
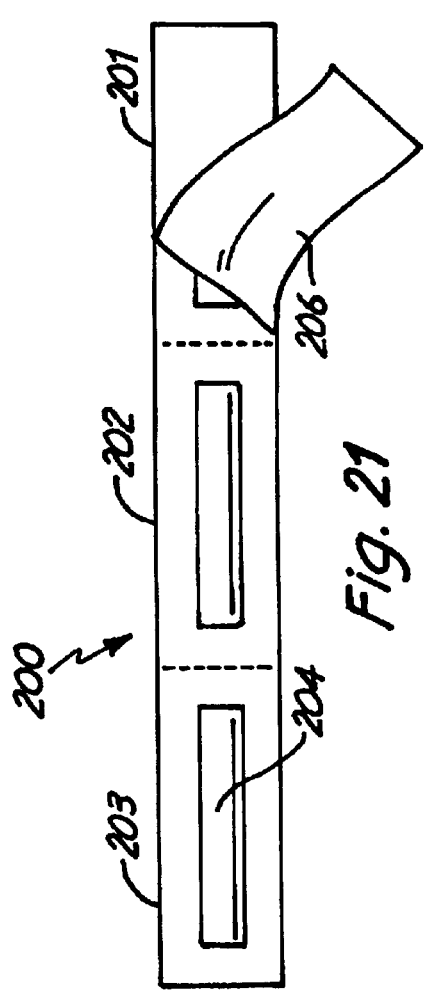
FIG. 21 is front planar view of the barrier strip, according to one embodiment of the present invention.

FIG. 21 illustrates barrier strip 200 as a non-permeable cover 206 is being removed to expose each desiccant satchel 204 containing desiccant. FIG. 22 illustrates the general construction of the barrier strip 200. The barrier strip 200 includes a non-permeable base layer 208, to which a layer of adhesive 212 is applied. An adhesive cover 210 is provided to protect the adhesive layer 212 until the barrier strip 200 is to be applied to the vapor barrier 14. A desiccant satchel 204 is provided having permeable walls 205 and containing one or more desiccant materials (not shown). The desiccant satchel 204 is formed from a moisture permeable material so that ambient moisture can be adsorbed. The satchel 204 is covered by a permeable cover layer 207 to support the satchel 204 on the strip 200. Alternatively, the permeable cover layer 207 forms a permeable wall 205 of the satchel 204 while the non-permeable base layer 208 forms another wall 205 of the satchel 204. To protect the desiccant satchel 204 from exposure prior to its intended use, a removable, non-permeable cover 206 is provided.

Figure 23:
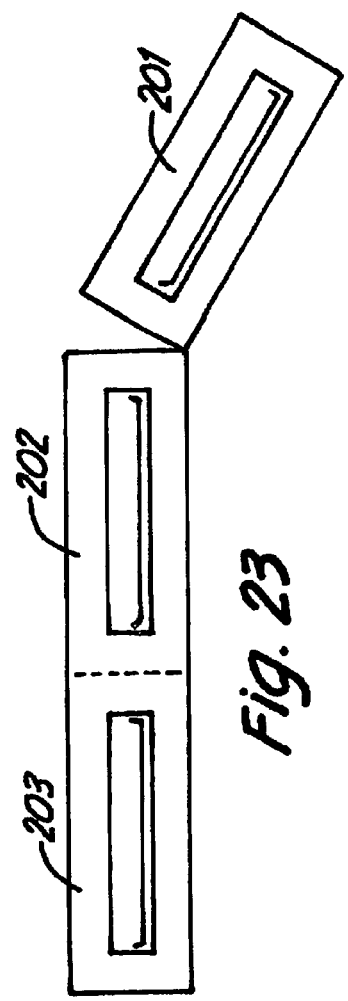
FIG. 23 is a front planar view of a barrier strip having one section partially removed, according to one embodiment of the present invention.

FIG. 23 illustrates that barrier strip 200 is formed from a plurality of individual satchel packets 201, 202, 203 to form any desired length. Generally, the barrier strip 200 will be provided in bulk and sections will be torn off to form a desired length. The adhesive backing 210 is removed and the barrier strip is then affixed to the vapor barrier 14 in the appropriate locations. Just prior to covering the vapor barrier 14, the cover 206 is removed so that moisture can be adsorbed.

As with the desiccant strip 10, the permeable cover layer 207 of the barrier strip 200 is a permeable plastic material. For example, the plastic material can be woven olefin or an uncoated, high-density polyethylene material such as Tyvek. In another aspect of the invention, the cover layer 207 is a fabric or a paper. Examples of appropriate paper material include filter paper, Kraft/crepe paper, or any other permeable paper material capable of serving as the permeable cover layer 207. In embodiments in which the satchel 204 has permeable walls 205 independent of the base layer 208 and the permeable cover layer 207, the permeable walls 205 can also be a permeable plastic material, a fabric, or a paper. The base layer 208 is wax paper. Alternatively, the base layer 208 is a plastic or plasticized paper. In a further alternative, the base layer 208 is any non-permeable material that can serve as a back-lining. The non-permeable cover 206 is made of material similar to the base layer 26.

According to one embodiment, the barrier strip 200 is made by placing desiccant 22 at regular intervals between a strip of base layer 208 and a strip of permeable cover layer 207, joining or sandwiching the base layer 208 and permeable cover layer 207 together to form satchels 204 of desiccant 22 where the desiccant 22 was placed, and sealing the base layer 208 and permeable cover layer 207 with a heat process to form the desiccant strip 200. For example, the strip 200 can be made using an apparatus that positions a strip of base layer 208 next to a strip of permeable cover layer 207, injects desiccant 22 at appropriate intervals along the length of the base layer 208 and cover layer 207, places the base layer 208 and cover layer 207 in contact to form satchels 204, and then applying heat to the base layer 208 and cover layer 207 such that the layers are sealed together to form the desiccant strip 200. Alternatively, the strips 200 can be made by any apparatus that provides for sealing desiccant 22 into satchels 204 at appropriate intervals along a length of a base layer 208 sealed to a permeable cover layer 207. In another embodiment, the satchels 204 are made by sealing desiccant 22 in a pouch with permeable walls 205, and then the satchels 204 are sealed between a strip of base layer 208 and a strip of cover layer 207.

As illustrated in FIG. 20, barrier strips 200 can be placed in the lower portion of the vapor barrier 14 in each wall cavity 9 to absorb the moisture that condenses and runs down the vapor barrier 14. In addition, barrier strips can be placed in any desired location and any location where mold is traditionally problematic. For example, mold often tends to accumulate near the upper corners of walls in bathrooms. Thus, the barrier strips 200 can be added there. As noted above, openings in the drywall 11 or finish materials may lead to the introduction of moisture. Thus, the barrier strips 200 can be added to these locations. FIG. 24 illustrates a plurality of barrier strips 200 surrounding an installed electrical box 220, that creates an opening through the drywall 11. Similarly, FIG. 25 illustrates an air vent 222 having barrier strips 200 affixed above and below the vent 222. Generally, the barrier strips are attached to the vapor barrier 14; however, they could be attached to the rear surface of the drywall 11 or any other finish material. This may make the installation of the drywall 11 more complex if the barrier strips 200 align with a stud 8, as this will result in an increased gap.

The barrier strips 200 and the desiccant strips 10 are ideal for adsorbing moisture trapped within a compartment. As noted above, however, there may be situations where airflow is permitted into a given compartment and moisture can be introduced over time. The desiccant spike 50 and jamb strip 90 discussed above offer one way to address this moisture; that is to test for its presence and/or remove the moisture.

VIII. Receiver

FIG. 26 illustrates a receiver 250 that will allow desiccant to be easily replenished within wall cavities on a maintenance schedule. This can be done as a preventative measure to address moisture that might accumulate or can be used when moisture is known to be a problem.

The receiver 250 is installed where a base or molding can be used as a cover, thus the receiver 250 is preferably installed at the top or the bottom of the wall cavity 9. As not all construction will include a crown molding and crown molding is more difficult to work with, the easiest installation is at the bottom of the wall cavity 9. The receiver 250 is anchored to the adjacent studs 8 and to the bottom plate 6. The receiver 250 can be made from a material such as nylon so that screws, nails or other fasteners can be utilized without fracturing the receiver 250. As illustrated, the receiver 250 is a modular component and includes a cavity desiccant receiver 252 and a barrier desiccant receiver 254. The cavity desiccant receiver 252 is coupled to a flexible mesh receiving stocking 262 disposed within the wall cavity 9 and anchored to a suspension bar 264 disposed between adjoining studs 8. The stocking 262 is a receptacle that could just as easily be a rigid, permeable component. As will be described in greater detail, a desiccant cartridge can be inserted through an opening behind cavity receiver faceplate 256. Thus, desiccant can easily be replaced within the wall cavity 9. Similarly, desiccant is inserted through an opening behind barrier faceplate 258. Thus, desiccant is replaceably introduced into the gap between the vapor barrier 14 and the finish materials 11.

FIGS. 27–29 illustrate one embodiment of a desiccant cartridge 270 that can be introduced through the opening behind cavity receiver faceplate 256. The desiccant cartridge contains a supply of one or more types of desiccant and could include an indicating desiccant to indicate the presence of moisture. The supply of desiccant can either be replaced, moisture can be removed by heating, or an entirely new cartridge 270 can be used. As the cartridge 270 is inserted, it is flexible and conforms to the receiving stocking 262 as indicated in FIG. 29. Though not shown, the receiving stocking is located within the insulation and serves to guide the cartridge 270 so as not to damage or displace the insulation.

FIGS. 30 and 31 illustrate one embodiment of cavity receiver faceplate 256. Locking tabs 280 can be provided to selectively secure the plate in place. A relief tang 282 can be provided to provide a gripping point for finger or a tool such as pliers so that the faceplate 256 can be easily removed.

FIG. 32 is a side, sectional view illustrating that barrier receiver 252 is located between the vapor barrier 14 and the drywall 11. A barrier desiccant satchel 300 containing a quantity of desiccant is selectively and replaceably placed within the barrier receiver 252 and adsorbs moisture from the barrier cavity 198. After a predetermined period of time, the satchel 300 is removed. The desiccant within may be replaced, recharged through heating or a new satchel may be used. In any event, a satchel with active desiccant is replaced within the barrier receiver 252.

FIG. 33A more clearly illustrates the position of the receiver 250 with respect to the wall components. The vapor barrier 14 is sandwiched between the barrier receiver 254 and the cavity receiver 252, thus holding the vapor barrier 14 in place. This also illustrates how barrier receiver 254 gains access to the barrier cavity 198 while the cavity receiver 252 gains access to the wall cavity 9.

Once installed, the receiver 250 allows desiccant material to be routinely replaced within the wall cavity 9 or the barrier cavity 198. However, the receiver 250 itself may be unsightly or inappropriate for finished construction. Thus, it may be desirable to cover the receiver 250 with a more attractive finished product. As stated above, the receiver 250 is sized to coincide with various base moldings (or crown moldings if used in an upper part of a wall). FIGS. 33A–33D illustrate how a traditional wooden molding (or other solid material) can be used with receiver 250. A cap strip 310 is nailed or otherwise affixed to the drywall 11. The wooden molding is a base 312 that has an upper surface that engages the cap strip so that the base 312 is held flush to the drywall 11. Additionally, and optionally a hook and loop type fastener 316 can be applied to a rear surface 314 of base 312 to further serve to affix the base 312 to the receiver 250. Of course, any type or style of base or mold could be utilized to cover receiver 250 and any type of fastening device or system could be employed so long as access to the receiver 250 is permitted.

Figure 34C:
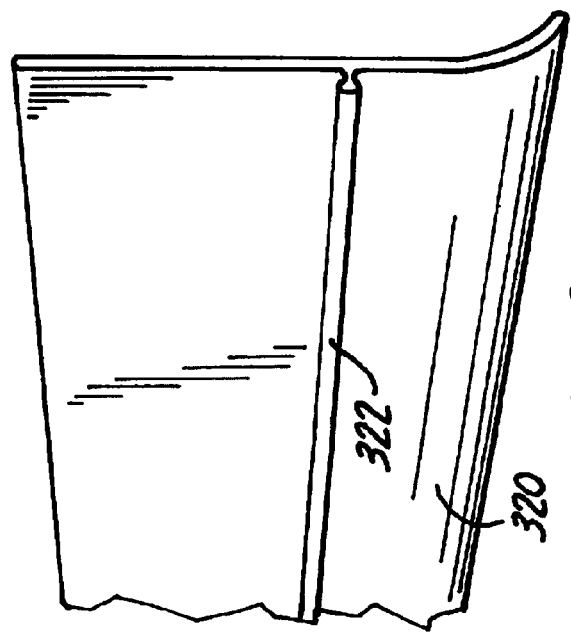
FIGS. 34A–34C illustrate a base portion with an integrated tab, according to one embodiment of the present invention.
Figure 34B:
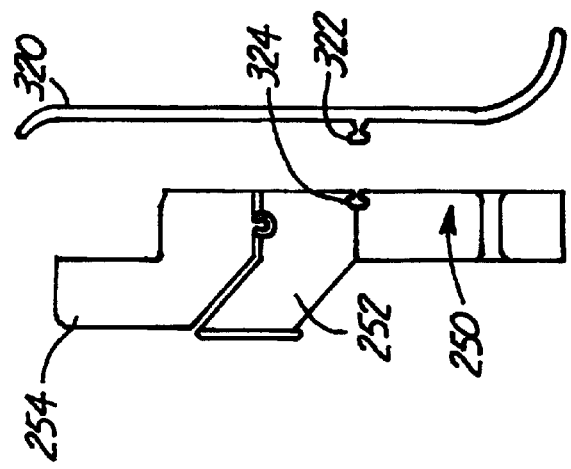
Figure 34A:
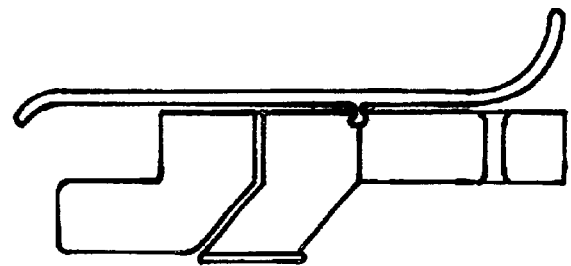

In many commercial construction applications, a rubber or flexible cover base 320 is used as illustrated in FIGS. 34A–34C. The cover base 320 can also be used to obscure the receiver 250 by providing a bead 322 along a rear surface that engages a groove 324 provided in the receiver 250. The cover base 322 is pressed against the receiver 250 and the bead 322 snaps into the groove 324 to hold the cover base 322 in place.

Figure 35:
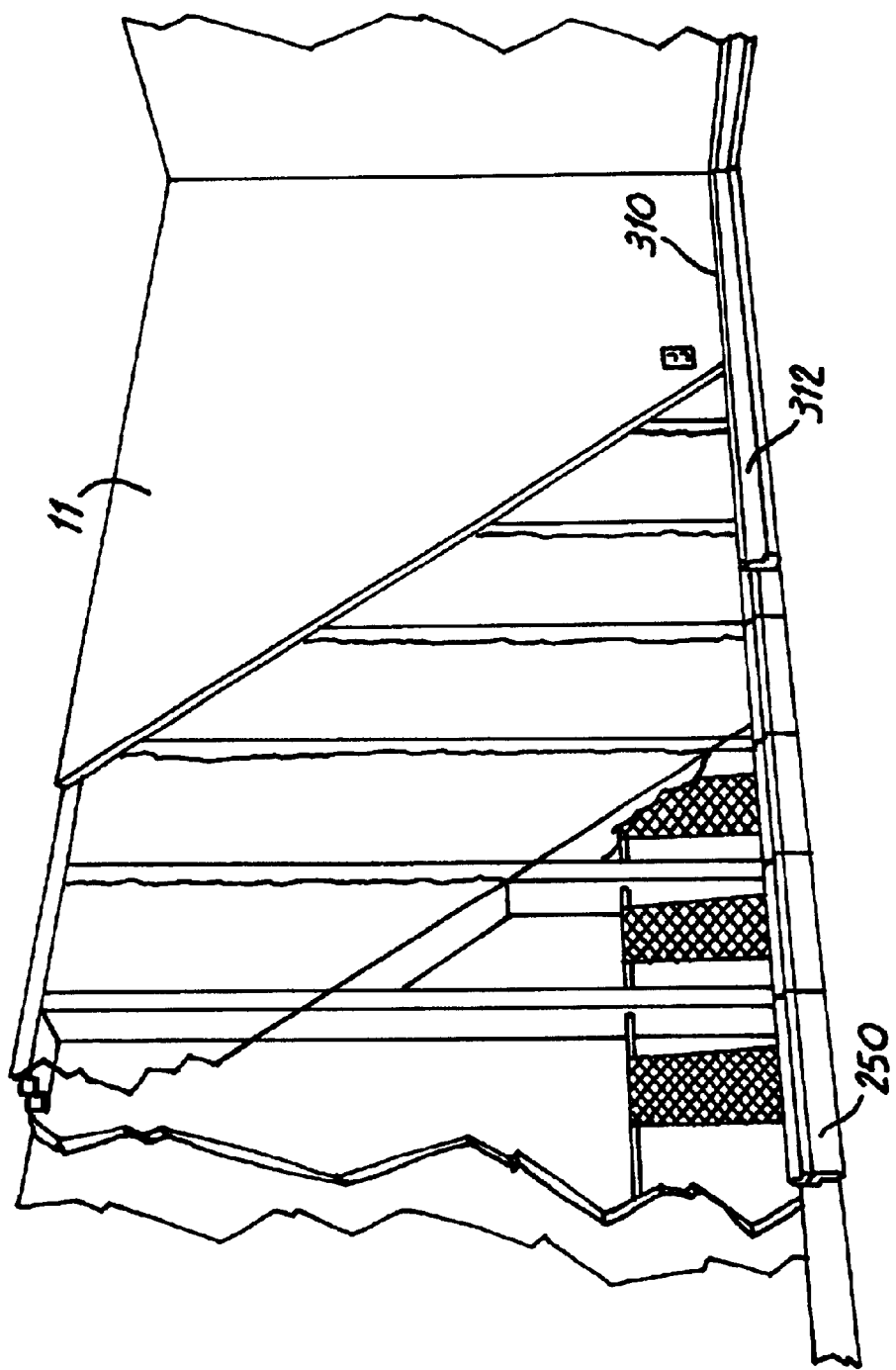
FIG. 35 illustrates a base and a cap strip installed on an interior wall with the desiccant receiver, according to one embodiment of the present invention.
Figure 36:
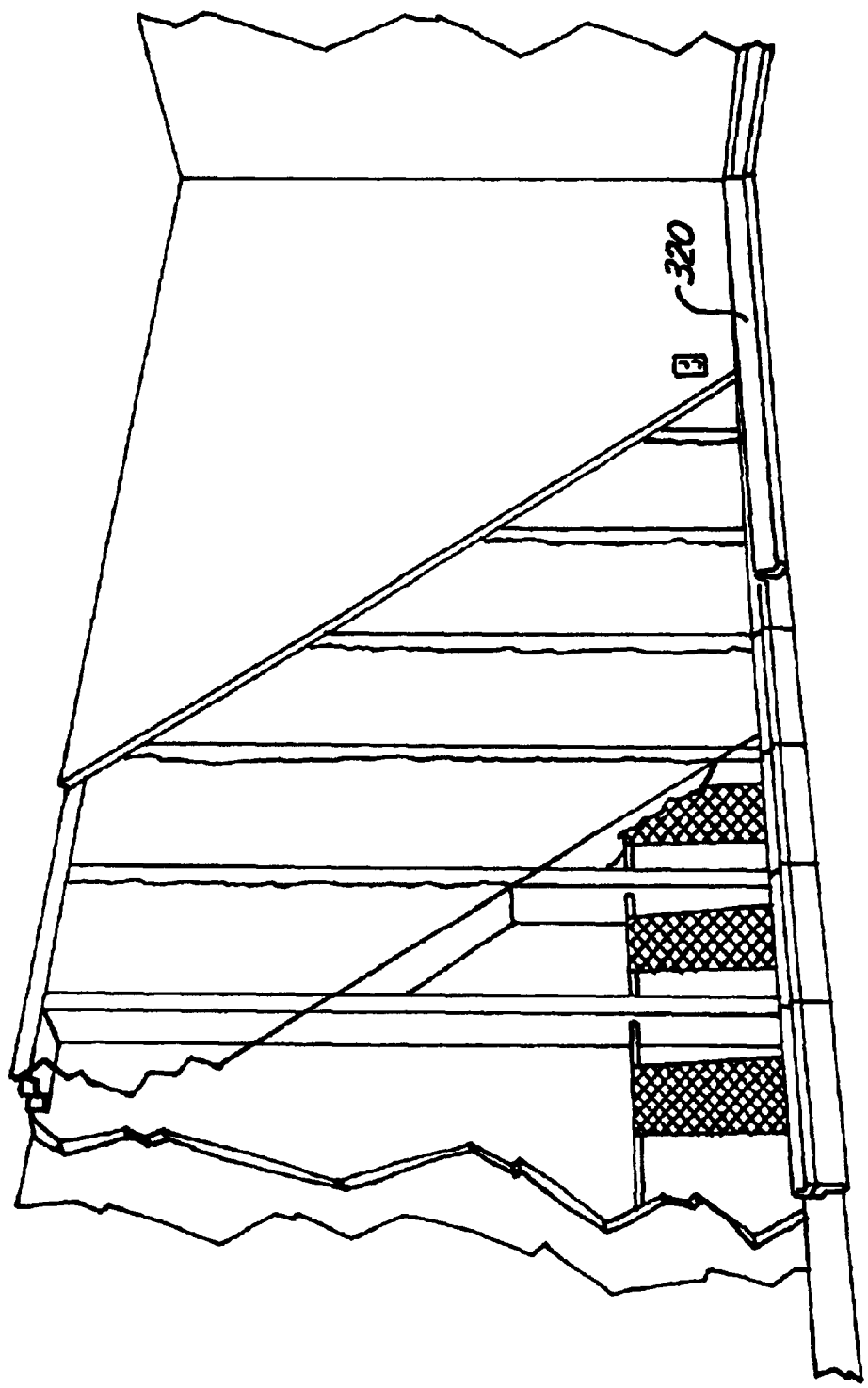
FIG. 36 illustrates a base with an integrated tab installed on an interior wall with the desiccant receiver, according to one embodiment of the present invention.

FIG. 35 illustrates the receivers 250 in place and illustrates how a separate receiver 250 is used for each wall cavity 9. The receivers 250 abut one another to form a continuous line. The wood base 312 is illustrated to show how it covers and obscures the receivers 250. The drywall 11 is shortened by the receivers 250 because the drywall 11 rests on top of, and flush with, the receivers 250. FIG. 36 is a similar view illustrating the use of the cover base 322 to obscure the receivers 250.

Another embodiment of the present invention for controlling the moisture in the barrier cavity 198 is a drywall desiccant apparatus for controlling moisture levels. Any desiccant material or combination of desiccant materials capable of adsorbing moisture can be used in the drywall desiccant apparatus. Desiccant 22 is integrated into a sheet of drywall 11, which is then placed onto the wall assembly 12, making the barrier cavity 198 moisture-tight. The moisture-tight seal traps any existing moisture in the cavity 198. The desiccant 22 in the drywall 11 reduces the moisture level in the cavity 198 by adsorbing the moisture. Alternatively, a desiccant paper capable of adsorbing moisture present in the barrier cavity 198 can be placed on a side of the drywall 11 inside the barrier cavity 198.

The various desiccant delivery systems described herein can be used in any number of construction and remedial applications, for both residential and commercial construction. They may be used in new home and building construction to prevent problems associated with the dispersion of moisture from building materials; they may be used as a remedial measure to address a moisture problem in an existing structure; or they may be installed to permit desiccant to be exchanged on a periodic basis. The desiccant delivery systems can be used in new construction, pre-assembled homes or other pre-assembled structures, commercial buildings, trailer homes, or any other type of building where moisture removal is an issue.

Although the present invention has been described with reference to preferred embodiments, persons skilled in the art will recognize that changes may be made in form and detail without departing from the spirit and scope of the invention.

What is claimed is:

1. A method of reducing moisture within a wall cavity of a building comprising:
   providing a permeable container containing a desiccant; and
   placing the permeable container into a wall cavity of a building, wherein the desiccant and the permeable container are configured to reduce moisture originating within the wall cavity.

2. The method of claim 1 further comprising inserting the desiccant into the permeable container, wherein the permeable container is an implant.

3. A method of controlling moisture within a wall cavity of a building comprising:
   providing a permeable container containing a desiccant;
   placing the permeable container into a wall cavity of a building;
   removing the permeable container;
   removing moisture from the desiccant; and
   replacing the permeable container into the wall cavity.

4. The method of claim 1 wherein placing the permeable container into the wall cavity further comprises attaching the permeable container to a surface in the wall cavity.

5. The method of claim 1 wherein the wall cavity is a fenestration cavity.

6. The method of claim 1 wherein the wall cavity is a barrier cavity.

7. The method of claim 6 wherein placing the permeable container into the barrier cavity further comprises attaching the permeable container to a surface in the barrier cavity.

8. A method of controlling moisture within a wall cavity of a building comprising:
providing a permeable container containing a desiccant;
placing the permeable container into a barrier cavity of a building;
removing the permeable container;
removing moisture from the desiccant; and
replacing the permeable container into the barrier cavity.

9. A method of controlling moisture comprising:
providing a support including
a permeable container including a desiccant; and
a non-permeable layer removably attached to the support such that the non-permeable layer covers the permeable container;
attaching the support to a surface in a wall cavity; and
removing the non-permeable layer.

10. The method of claim 9 further comprising sealing the building cavity.

11. The method of claim 9 wherein the support further comprises:
a base layer adjacent to the permeable container; and
a permeable cover layer located between the permeable container and the non-permeable cover.

12. The method of claim 11 wherein the support further comprises:
an adhesive layer on a side of the base layer opposite the non-permeable layer; and
a backing layer removeably coupled to the adhesive layer.

13. A method of controlling moisture comprising:
creating a hole in a finish material of a building cavity;
inserting a permeable container containing a desiccant through the hole and into the building cavity; and
closing the hole with a plug attached to the permeable container.

14. The method of claim 13 further comprising:
removing the plug from the hole;
removing the permeable container from the building cavity;
voiding the desiccant of moisture;
re-inserting the permeable container containing the voided desiccant into the building cavity; and
re-closing the hole with the plug attached to the permeable container.

15. The method of claim 14 wherein the desiccant includes an indicating desiccant, the method further comprising examining the desiccant to determine a moisture level of the building cavity.

16. The method of claim 15 further comprising voiding and re-inserting the plug and the permeable container if the moisture level is undesirable.

17. The method of claim 15 further comprising permanently inserting the plug and the permeable container into the building cavity if the moisture level is satisfactory.

18. The method of claim 15 further comprising permanently inserting the plug and the permeable container into the building cavity if the building cavity has reached an equilibrium capacity.

19. A method of controlling moisture comprising:
creating a hole in a finish material of a wall assembly wherein the hole defines fluid access to a cavity within the wall assembly; and
inserting a permeable implant containing a desiccant into the hole.

20. The method of claim 19 wherein the desiccant includes an indicating desiccant, the method further comprising examining the desiccant through a transparent faceplate at a proximal end of the implant.

21. The method of claim 19 further comprising forming a seal between a flange on the permeable implant and the finish material wherein the seal prevents air from entering the cavity through the hole.

22. The method of claim 19 further comprising:
removing the implant from the hole;
voiding the desiccant of moisture; and
re-inserting the implant into the hole.

23. The method of 22 further comprising permanently inserting the implant into the hole when the cavity has reached an acceptable moisture level.

24. The method of claim 19 further comprising:
removing the implant from the hole; and
examining the desiccant to determine if the desiccant should be voided of moisture.

25. The method of claim 24 further comprising:
voiding the desiccant of moisture if it is determined that the desiccant should be voided of moisture; and
re-inserting the implant containing the voided desiccant into the hole.

26. The method of claim 25 further comprising repeating the removing, voiding, and re-inserting of the implant until the cavity has reached an acceptable moisture level.

27. The method of claim 24 further comprising re-inserting the implant containing the desiccant into the hole if it is determined that the desiccant need not be voided of moisture.

28. The method of claim 19 wherein the hole is located in the finish material on an exterior side of the wall assembly.

29. The method of claim 19 wherein the hole is located in the finish material on an interior side of the wall assembly.

30. A method of controlling moisture comprising:
providing a mixture of a desiccant and building insulation; and
placing the mixture into a building cavity, wherein the mixture is not contained within a vacuum-sealed packaging when the mixture is placed into the building cavity.

31. The method of claim 30 further comprising mixing the desiccant with the building insulation to create the mixture.

32. A method of controlling moisture comprising:
providing a mixture of a desiccant and building insulation; and
blowing the mixture into a building cavity.

33. The method of claim 32 further comprising boring a hole in a finishing surface of the building cavity.

34. A method of controlling mold comprising:
providing a permeable container containing a desiccant; and
placing the permeable container into a wall cavity, wherein the permeable container is configured to reduce moisture originating within the cavity.

35. A method of controlling moisture comprising:
providing a permeable container containing a desiccant; and inserting the permeable container into a wall assembly cavity through a receiver into a permeable receptacle, the receiver configured to be in communication with the permeable receptacle.

36. The method of claim 35 wherein the wall assembly cavity is a wall cavity.

37. The method of claim 35 wherein the wall assembly cavity is a barrier cavity.

38. A method of controlling moisture comprising:

providing a first permeable container containing a first desiccant;

inserting the first permeable container into a permeable wall receptacle in a wall cavity through a cavity receiver;

providing a second permeable container containing a second desiccant; and inserting the second permeable container into a barrier cavity through a barrier receiver.

39. A method of reducing moisture in a building cavity including the moisture that originates from lumber within the cavity, comprising:

providing a permeable container containing desiccant; and placing the permeable container into the building cavity to reduce the moisture that originates from the lumber within the cavity.

* * * * *